US007051206B1

(12) United States Patent
Giest et al.

(10) Patent No.: US 7,051,206 B1
(45) Date of Patent: May 23, 2006

(54) SELF-AUTHENTICATION OF VALUE DOCUMENTS USING DIGITAL SIGNATURES

(75) Inventors: Bruce K. Giest, Sterling Heights, MI (US); Thomas D. Hayosh, Bloomfield Hills, MI (US)

(73) Assignee: Unisys Corporation, Blue Bell, PA (US)

( * ) Notice: Subject to any disclaimer, the term of this patent is extended or adjusted under 35 U.S.C. 154(b) by 1011 days.

(21) Appl. No.: 09/707,433

(22) Filed: Nov. 7, 2000

(51) Int. Cl.
*H04L 9/00* (2006.01)
(52) U.S. Cl. .................. 713/176; 380/282; 380/285; 705/67
(58) Field of Classification Search ............... 713/155, 713/176; 380/277
See application file for complete search history.

(56) References Cited

U.S. PATENT DOCUMENTS

| 5,337,358 A | * | 8/1994 | Axelrod et al. ............... 705/75 |
| 5,341,428 A | | 8/1994 | Schatz .......................... 380/23 |
| 5,509,692 A | | 4/1996 | Oz .............................. 283/70 |

(Continued)

FOREIGN PATENT DOCUMENTS

| EP | 0 286 378 A2 | 10/1988 |
| EP | 0 600 646 A2 | 6/1994 |
| EP | 0 710 934 A2 | 5/1996 |
| EP | 0 889 448 A2 | 1/1999 |

OTHER PUBLICATIONS

Standards For Efficient Cryptography, "SEC 1:Elliptic Curve Cryptography", Certicom Research, Sep. 20, 2000, Version 1.0.

Standards For Efficient Cryptography, "SEC2: Recommended Elliptic Curve Domain Parameters", Certicom Research, Sep. 20, 2000, Version 1.0.
International Search Report, Jan. 16, 2003.

*Primary Examiner*—Kambiz Zand
(74) *Attorney, Agent, or Firm*—Lisa A. Rode; Mark T. Starr

(57) ABSTRACT

An encryption-free technique for enabling the self-authentication of value documents (including personal and commercial checks) presented at a point of purchase or financial institution. Certain data contained on the value document may be signed with a first digital signature and authenticated with a public key certificate issued from a trusted certificate authority. The signed data and public key certificate are stored on the value document, preferably in a two-dimensional bar code data format. In the case of certain personal value documents (such as checks, credit cards, passports, birth certificates, Social Security cards, etc.), a unique personal identification number (PIN) also may be included in the document data that is signed by a second digital signature. At a point of purchase, a merchant or teller can scan and read the data stored in the two-dimensional bar code and other magnetically recorded information, and together with the PIN the customer provides, can authenticate the value document thus presented using the second digital signature. Alternatively, if the customer is not present, if the personal value document contains the second digital signature, the document may be verified using a PIN-generating algorithm or other method that generates all permutations of PINs. The first digital signature alone may be used to authenticate selected data within the personal value document even when the PIN is not available. Similarly, in the case of a commercial value documents, authentication of pre-printed data may be based entirely upon only the first digital signature.

103 Claims, 13 Drawing Sheets

U.S. PATENT DOCUMENTS

| | | | |
|---|---|---|---|
| 5,737,886 A | 4/1998 | Kruckemeyer | 283/67 |
| 5,742,685 A | 4/1998 | Berson et al. | 380/25 |
| 5,793,868 A * | 8/1998 | Micali | 380/28 |
| 6,073,121 A | 6/2000 | Ramzy | 705/45 |
| 6,170,744 B1 | 1/2001 | Lee et al. | 235/380 |
| 6,202,157 B1 * | 3/2001 | Brownlie et al. | 713/201 |
| 6,289,323 B1 * | 9/2001 | Gordon et al. | 705/40 |
| 6,324,525 B1 * | 11/2001 | Kramer et al. | 705/40 |

* cited by examiner

| Certificate field description | No. bytes stored |
|---|---|
| Number of bytes in certificate $m$ | 1 byte |
| Certificate version number | 2 byte |
| Certificate serial number | 4 bytes |
| Date certificate becomes valid | 3 bytes |
| Date certificate expires | 3 bytes |
| Public key data bytes | 22 bytes |
| Name of public key owner | $m$-77 bytes |
| Digital signature | 42 bytes |

ECDSA based short certificate format.

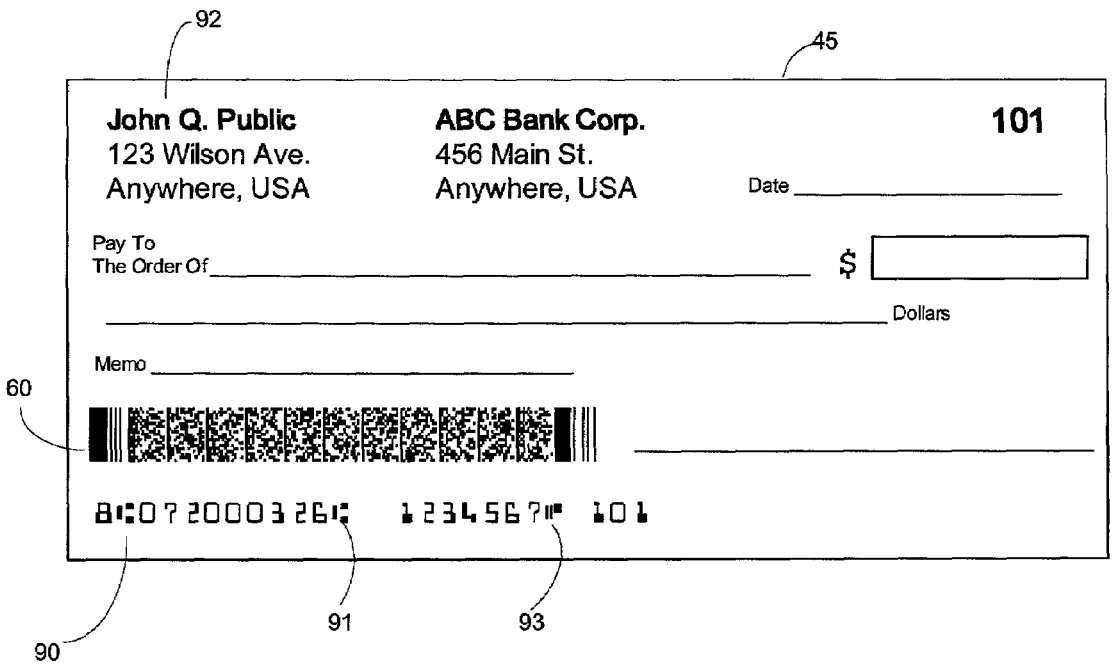

FIGURE 5

| Field No. | Bar code field description | No. bytes stored |
|---|---|---|
| 1 | Number of bytes in bar code: $k$ | 2 bytes |
| 2 | Certificate | $m$ bytes |
| 3 | Number of bytes $f$ in Field No. 4 ($f=0$ if no non-MICR information included) | 1 byte |
| 4 | Non-MICR Critical Document Data (e.g., account name/address field or payee name, amount and issue date) | $f$ bytes |
| 5 (optional) | Digital Signature 2 (on critical doc. data + PIN) | 42 bytes |
| 6 (optional) | Digital Signature 1 (on critical document data) | 42 bytes |

Bar code data string 60

FIGURE 6

SELF-AUTHENTICATION OF VALUE DOCUMENTS USING DIGITAL SIGNATURES

CROSS-REFERENCE TO RELATED APPLICATION

This application is related to:

U.S. Pat. No. 6,600,823 (Jul. 29, 2003)(Hayosh) entitled "Apparatus and Method for Enhancing Check Security," filed Oct. 16, 1997; and, U.S. Pat. No. 6,212,504 (Apr. 3, 2001)(Hayosh) entitled "Self-Authentication of Value Documents Using Encoded Indices," filed Jan. 6, 1999, both of which are assigned to the assignee of the present application and which are incorporated in their entirety by reference herein.

FIELD OF THE INVENTION

The present invention generally relates to authentication of value documents. More particularly, the invention relates to a method and system for authenticating personal checks and commercial checks, as well as other personal documents and commercial value documents, wherein the data in these documents is unencrypted but secured through a digital signature.

BACKGROUND OF THE INVENTION

Printed documents of any kind are becoming substantially easier to forge as technology advances. Personal and business checks are no exception. For example, enhanced and inexpensively available home desktop publishing technology now widely available makes forging checks easier than ever.

In addition, check processing is rapidly evolving. To reduce the costs of processing personal checks tendered for payment at a point of sale, banks, electronic fund transfer networks, and merchants seek new, more efficient methods for processing personal checks. For example, one new check processing method converts a check into an electronic funds transfer at the time the check is tendered. Specifically, the checking account information in the magnetic ink character recognition (MICR) code line at the bottom of a personal check provides the customers account information to a process that initiates an electronic funds transfer from the customers checking account to the merchant.

Because producing a paper check that looks legitimate is much easier than it once was, and because novel, non-traditional check processing introduces new security risks, enhanced anti-fraud measures are particularly important.

Although authentication methods have been proposed to address these serious concerns, many of these proposals include the use of encryption-based techniques, such as a smart card (or device with similar functionality). With such smart cards, information is usually secured through the use of a data encryption algorithm. Problematically, the use of encryption and encryption smart cards as specified in this approach would likely require export control review by appropriate United States federal agencies before products based on this approach could cross an international boundary. In addition, every participating payee must be issued a smart card containing sensitive, highly private encryption parameters. This form of encryption key management is expensive and may be no more secure than the smart cards themselves.

It is therefore desirable to provide a self-authentication system that is free of the above defects—namely, that does not require the use of numerous expensive smart cards or similar devices, and that does not require data encryption.

SUMMARY OF THE INVENTION

In a first aspect of a preferred embodiment of the invention, a method for printing authentication information on a value document is provided. The method includes the step of generating a first digital signature based on a critical data string and a second digital signature based on an authenticatable data string and a private key. The method further includes the step of obtaining a public key certificate from a certifying authority. According to one aspect of the present invention, the first digital signature, second digital signature and the public key certificate are then fixed to the document. Fixing security data to the document allows a significant reduction in the costs associated with authentication. Furthermore, reliability is improved due to elimination of the need for additional devices, cards etc.

In a second aspect of a preferred embodiment of the invention, a method for authenticating a personal value document is provided. The method includes the step of assembling an authenticatable data string based on machine-readable critical document data contained on the document and a personal identification number (PIN) of a user. Machine-readable security data is retrieved from the document, where the security data includes a public key, its certificate, and a second digital signature. The method further provides for validating the digital signature based on the public key and the authenticatable data string. Retrieving the security data from the document allows a simplified approach to authentication that does not require encryption or additional devices.

In a third aspect of a preferred embodiment of the present invention, a method for authenticating a personal or commercial value document is provided. The method includes the step of assembling a critical data string based on machine-readable critical document data contained on the document. Machine-readable security data is retrieved from the document, where the security data includes a public key, its certificate, and a first digital signature. The method further provides for validating the digital signature based on the public key and the critical document data string In a fourth aspect of a preferred embodiment of the invention, a payment system for verifying a check at a point of presentment includes a check reading system with an image scanner system, a data entry PIN pad, a parsing module, and a validation module. The PIN pad allows the entry of a user PIN and the document reader with an image scanner system allows the retrieval of machine-readable critical document data and machine-readable security data from the document, where the data processing system assembles an authenticatable data string based on the critical document data and the user PIN. The parsing module extracts a public key and its certificate and a digital signature from the security data. The validation module validates the digital signature based on the public key and the authenticatable data string.

BRIEF DESCRIPTION OF THE DRAWINGS

The invention is set forth in exemplary fashion by the following detailed description of a preferred embodiment taken in conjunction with the drawings, in which:

FIG. 5 shows one embodiment of a personal check 45 including a bar code data string 60 and MICR line 90, which may be used in conjunction with a preferred embodiment of the authentication scheme of the present invention.

FIG. 6 shows one embodiment of the format 61 of bar code data string 60 that may be used in conjunction with a preferred embodiment of the authentication scheme of the present invention.

DETAILED DESCRIPTION OF THE PREFERRED EMBODIMENTS

Figure 1:
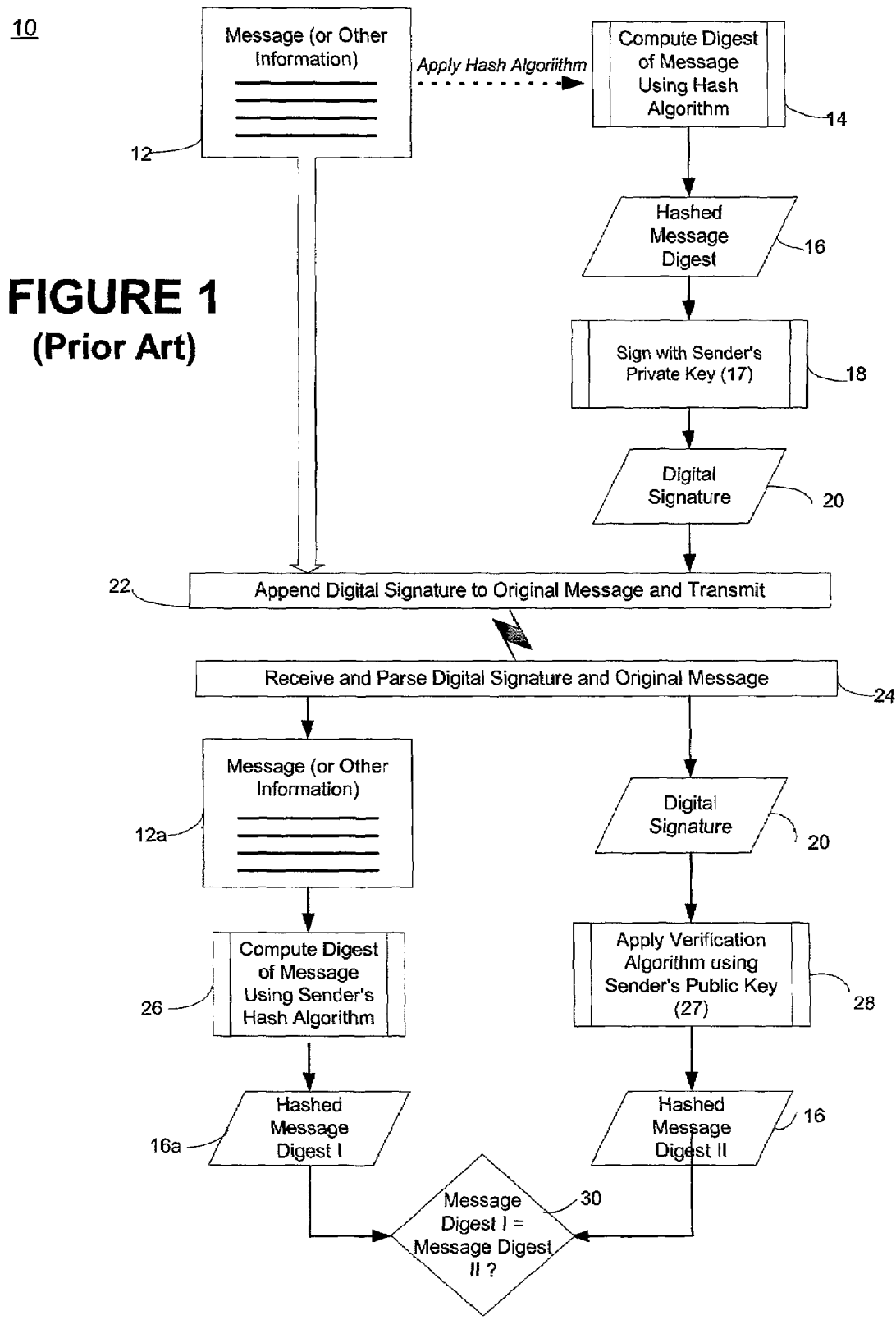
FIG. 1 shows a flowchart showing an overview of a known digital signature scheme.

As set forth above, it is desirable to provide an authentication system that does not require the use of smart cards, and that does not require data encryption. As will be described in more details in the forthcoming paragraphs, it was found that, for both personal and commercial value documents, the use of a digital signature and a public key certificate affixed to the document itself can accomplish this goal.

In a preferred embodiment of the present invention, a first digital signature is used to sign selected pre-printed data within a personal document and a second digital signature is used to sign this pre-printed data and a unique personal identification number (PIN) chosen either by the personal document owner or the entity responsible for printing the document. The addition of a public key certificate issued from a trusted certificate authority (CA), along with these two digital signatures, provides a self-authenticating document that can be used at point of purchase to validate that the document has not been tampered with and that the person writing the check has authority to do so. In an alternate embodiment of the present invention, the second digital signature is not present, and the first digital signature is used to sign selected pre-printed data within a commercial document.

Although the embodiments of the present invention are discussed below with respect to personal checks and commercial checks (including bank checks), and similar value documents, it will be appreciated that the present invention may also be applied to any other personal documents (including, birth certificates, drivers licenses, identification cards, access control cards, credit cards, voter registration cards, debit cards, passports, Social Security cards, and the like), and/or other commercial documents, (for example, event tickets, airline tickets, gift certificates, motor vehicle titles, negotiable letters of credit, currency, or the like) for which self-authentication is sought. Such alternate embodiments are intended to be within the spirit and scope of the present invention.

I. Overview of the Invention

For years, banks have dispensed personal identification numbers (PIN) with the automatic teller machine (ATM) cards that they issue their customers. Typically, a customer is queried for a private personal identification number (PIN) before account access is allowed. The PIN serves to authenticate the legitimate card user, and the customer is protected from unauthorized use of the ATM card because account access is limited to the account holder herself, and those who supply the correct PIN. Traditional check processing methods effected for personal checks at a point of presentment could benefit from a convenient PIN authentication scheme for use in authenticating legitimate owners and users of such personal checks.

It was found in the present invention that, in the case of personal checks and other personal identification documents (e.g., birth certificates, Social Security cards, etc.), the origin and un-tampered state of such document could be authenticated when a unique customer PIN is appended to certain pre-existing document data and is signed with a known digital signature algorithm by an authorized entity and then affixed to the document itself by this same entity. In addition, affixation to the document by this authorized entity of a public key certificate (issued by a trusted certificate authority (CA)) would serve to attest to the fact that the public key used to later verify this signed information did in fact belong to the authorized entity. Before outlining the details of this embodiment of the self-authentication method of the present invention, a brief overview of digital signature and public key certificates is believed to be in order.

A. Digital Signatures

Digital signatures have become an important tool in safeguarding data in the information age. This perceived importance is borne out by the recent institution on Jun. 27, 2000 of the Federal Information Processing Standard (FIPS) 186-2, Digital Signature Standard (DSS), by the National Institute of Standards and Technology (NIST). This standard enables federal agencies to use certain selected digital signature algorithms in conducting business. The importance of digital signature technology is further borne out by the enactment on Jun. 30, 2000, of Public Law 106-229 ("Electronic Signatures in Global and National Commerce Act"), in which it is now legal to utilize digital technology to electronically sign transfer documents, for example, mortgage and real estate title transactions, credit and loan applications and many other legally binding documents. The act requires the adoption and utilization of digital signatures by Federal agencies where a handwritten signature is recognized as authenticating a document, and further seeks to encourage the use of digital signatures in private sector electronic transactions. Although the latter act is primarily directed to the use of digital representations of a person's handwritten signature (perhaps better-monikered as a "digital signature of a signature"), digital signature technology is substantially more encompassing.

As known to those skilled in the art, a common type of digital signature is essentially a secret coding or signing of a digest (the "hash") of a message or other information that is typically appended to the electronic message itself. When used appropriately (i.e., in a suitably defined process), the digital signature ensures that the document originated with the person signing it and that it was not tampered with after the signature was applied. Thus, by "signing" the message in this manner, the message is made tamper-evident, and by indicating message origin, the digital signature allows the possessor of the digital signature and message to prove the origin and integrity of that message to an independent third party. This last property is often referred to as non-repudiation of message origin and message contents.

Digital signatures are often created and verified using a two-key cryptographic system (also referred to as public-key or asymmetric cryptographic systems) (hereinafter "public-key cryptography"). In such cryptographic systems, each user has a public key and a private key. As the nomenclature would suggest, the public key is generally made publicly available, while the private key is kept secret and known only to its owner. The private key is used to produce a digital signature at the message sender's end, while the public key part of the key pair is used to verify the digital signature at the message recipient's end.

Each entity wishing to use digital signatures must produce such a key pair—a private key and a public key. The method for generating this key pair varies with the particular scheme used. Currently known examples of such public-key cryptography systems include Integer Factorization systems such as RSA cryptography (which provides for both encryption and digital signatures), Discrete Logarithm systems such as Digital Signature Algorithm (DSA) cryptography (which provides only digital signature capabilities), elliptic curve cryptosystems (ECC) (including the elliptic curve digital signature algorithm (ECDSA) for providing digital signatures, and used in the preferred embodiments herein as discussed in more detail in the forthcoming paragraphs, and the elliptic curve integrated encryption scheme (ECIES) used for encryption), and the Diffie-Hellman key agreement protocol (an encryption technique for establishing secret keys over an insecure channel). Regardless of the particular scheme chosen, it is currently always the case that the private key and the message itself are used to actually calculate a digital signature of the message. On the other hand, the public key, the purported original message, and the purported digital signature of that message are required to verify that the signed message is valid. Thus, the public key verifies what the private key signs.

An example of a known digital signature technique as applied to an electronic message 10 in a public key cryptographic system is shown in FIG. 1. As seen therein, a hash algorithm (not shown) is applied at 14 to the message or other information 12 that a sender desires to send. The result is a message digest 16 or "hash" of the message 12. As known to those skilled in the art, the "hash" function H is any function that transforms an input string of any length m to an output that always has a fixed size string h; where h=H(m). In the case of cryptographic systems, it is also usually required that:

1) H(m) be relatively easy to compute for any given m;
2) H(m) be "one-way" (i.e., given a hash h it is difficult to find an m such that H(m)=h); and,
3) H(m) be "collision-free" (i.e., given a message m, it is difficult to find a different message n such that the hash functions of each if equal).

Once the hash 16 is computed, the sender signs it with his private key 17 at 18 to create a digital signature 20. The digital signature 20 is then preferably appended to the original message 12 at 22 and both are transmitted to the recipient. Upon receipt, the transmitted message is parsed into the purported original message 12a and the digital signature 20. Applying the same hash algorithm at 26 that the sender uses, the recipient calculates a message digest 16a of the message 12a. In addition, the recipient applies the sender's public key 27 at 28 to the received digital signature 20 in order to obtain the original message digest 16. The message digests 16 and 16a are then compared at 30. If they match, then the message is verified and the recipient can be assured that the message in fact originated with the person signing it and that it was not tampered with after the signature was applied. If message digests 16 and 16a do not match, then the message 12a is not authenticated, and thus either the message originated with another party, or was somehow altered after it was sent.

An important property of those public cryptography systems that produce digital signatures is that disclosure of the public key does not reveal the private key that was used to produce a digital signature. The act of verifying a digital signature in no way reveals information about the private key that produced the digital signature, since only the public key and the original message are used in the verification process. In other words, knowledge of the public key does not imply knowledge of the private key, and only the public key which is companion to the private key used to produce the digital signature will successfully verify the message/digital signature combination.

1. Elliptic Curve DSA

In choosing a digital signature scheme that is to secure data, it will be appreciated by those skilled in the art that a priority is to choose one which has the smallest key size for a given security level. The elliptic curve digital signature algorithm (ECDSA) currently offers the most security per binary bit of key material. Therefore, ECDSA is the preferred digital signature method for the present invention. However, it will be understood that any of the aforementioned digital signature schemes and algorithms could be used to effect the present invention, and therefore, such alternate schemes and algorithms and similar schemes and algorithms are intended to be within the spirit and scope of the present invention.

In 1994, the United States government published the Federal Information Processing Standards (FIPS) 186, which define the Digital Signature Algorithm (DSA). DSA signatures are calculated within a mathematical group commonly referred to as $Z_p^*$, which comprises the set of all positive integers less than a large prime integer p together with the mathematical operation multiplication modulo p. The operation of multiplication modulo p defines how two integers in the set $\{1 \ldots p-1\}$ are multiplied to get a result also in this set. For most choices $g \in Z_p^*$, it is conjectured that it is computationally infeasible to find y when only g and $g^y$ mod p are known. The problem of recovering y when g and $g^y$ mod p are known is called a "discrete logarithm problem" in $Z_p^*$. The security of the DSA rests on the intractability of solving discrete logarithm problems in the group $Z_p^*$.

Elliptic curve DSA, now an ANSI standard, ANS X9.62, is essentially the same signature scheme as the DSA, except that a novel mathematical group—an elliptic curve group—denoted $E(Z_p)$—is used instead of $Z_p^*$. One main type of elliptic curve group is defined by the following:
1. The set of all x-y pairs of integers between $\{0 \ldots p-1\}$ that satisfy an equation $y^2 \bmod p = x^3 + ax + b \bmod p$; and
2. A specially defined elliptic curve addition operation.

Here, a and b are specially chosen integers, and p is a large prime integer. Thus, the elements that compose this elliptic curve group are pairs of integers that satisfy a special relationship. Any two pairs of integers from the set can be added together using a special elliptic curve addition operation. The result of this addition is always an integer pair that is again in the set.

The discrete logarithm problem is even more difficult to solve in the case of an elliptic curve group $E(Z_p)$ than it is in the case of group $Z_p^*$. Because of this increased difficulty, ECDSA key sizes need not be as large in order to provide levels of security comparable to alternative signature schemes. For example, ECDSA signatures computed with parameters sized as indicated below are at least as secure as other digital signature schemes, such as 1024-bit DSA and 1024-bit RSA, but have added benefits, which will be enumerated below.

2. Security without Encryption

Confusion often arises between the use of the terms "digital signature" and "encryption," with the two terms often being understood to be interchangeable. While this may be true with respect to certain public key cryptographic schemes that essentially use the same algorithm to create a digital signature and to effect encryption (for example, Integer Factorization systems such as RSA), it is not necessarily true, and it is important to distinguish the difference for purposes of accuracy and this invention. More specifically, the following definitions, which are taken from Certicom Corporation's *Standards for Efficient Cryptography* (*SEC*) SEC1: Elliptic Curve Cryptography, V.1.0 (Sep. 20, 2000) (hereinafter, "SEC Standards V.1.0"), apply herein. (While the following definitions are used in the SEC Standards V.1.0 with respect to the ECC system, they are used herein to apply to all embodiments of the present invention, including those embodiments that use RSA or other Integer Factorization scheme):

A cryptographic scheme is a scheme that consists of an unambiguous specification of operations capable of providing a security service when properly implemented and maintained;

A digital signature scheme is a cryptographic scheme consisting of a signing operation and a verifying operation that is capable of providing data origin authentication, data integrity, and non-repudiation; and, An encryption scheme is a cryptographic scheme consisting of an encryption operation and decryption operation that is capable of providing data confidentiality.

As will be seen in the forthcoming paragraphs, only the signing and verifying operations are carried out in the present application. Importantly, no encryption or decryption operations are employed in order to ensure the security of the value document by providing non-repudiation of the information contained therein.

B. Public Key Certificates

The above discussion regarding authentication of a message using a public key and digital signature, assumes that the public key is in fact authentic. Verifying a digital signature using a public key of unknown origin does not necessarily prove origin or data integrity. In order to achieve true origin non-repudiation, public keys must be provably linked to the true public key owner. For example, an attacker could alter a message after it is created, and discard the original digital signature. The attacker could then issue a digital signature for the altered message using his private key, and claim that the public key which verifies the altered message's signature belongs to a third party. Thus, the attacker could fraudulently attribute responsibility for an altered message to that third party. This attack demonstrates that origin non-repudiation and data integrity follow only when the verifying public key is definitively linked to the owner of the corresponding private key. This may be achieved through the use of a public key certificate.

Public key certificates provide a mechanism for binding a public key to the identity of the owner of the corresponding private key, and generally contain at least three things:
a public key;
identity information for the owner of the public key; and,
a digital signature issued by a trusted third party of these two pieces of data.

In order for the public key certificate to bind the identity of a public key's owner to the public key itself, a trusted third party called a certificate authority (CA) must issue such certificates. Before creating a certificate, the CA takes appropriate (typically traditional, non-cryptographic) measures to verify the claimed identity information of the entity requesting the certificate. Once the identity information is verified, the CA will digitally sign a message containing the public key data and owners identity information. This digital signature and message together are called the public key certificate.

The certificate authority's public key, used for verifying signatures in certificates it issues, is widely distributed. For example, it may be published on the Internet and/or sent by courier to parties wishing to verify certificates. Once issued, a public key certificate may be used to prove the authenticity of an embedded public key and that it is owned by the entity identified in the certificate.

Additional information may be included in the certificate information that is digitally signed. Examples of such information include:
a validity period or expiration date of the public key being certified;
a unique serial number;
additional information about the key owner—e.g., street or Internet address;
public key algorithm the key is intended to be used with; and
information facilitating verification of the signature on the certificate (e.g., the certificate authority's name and the signature algorithm used to sign the certificate).

II. Creating the Self-Authenticating Value Document

Figure 2:
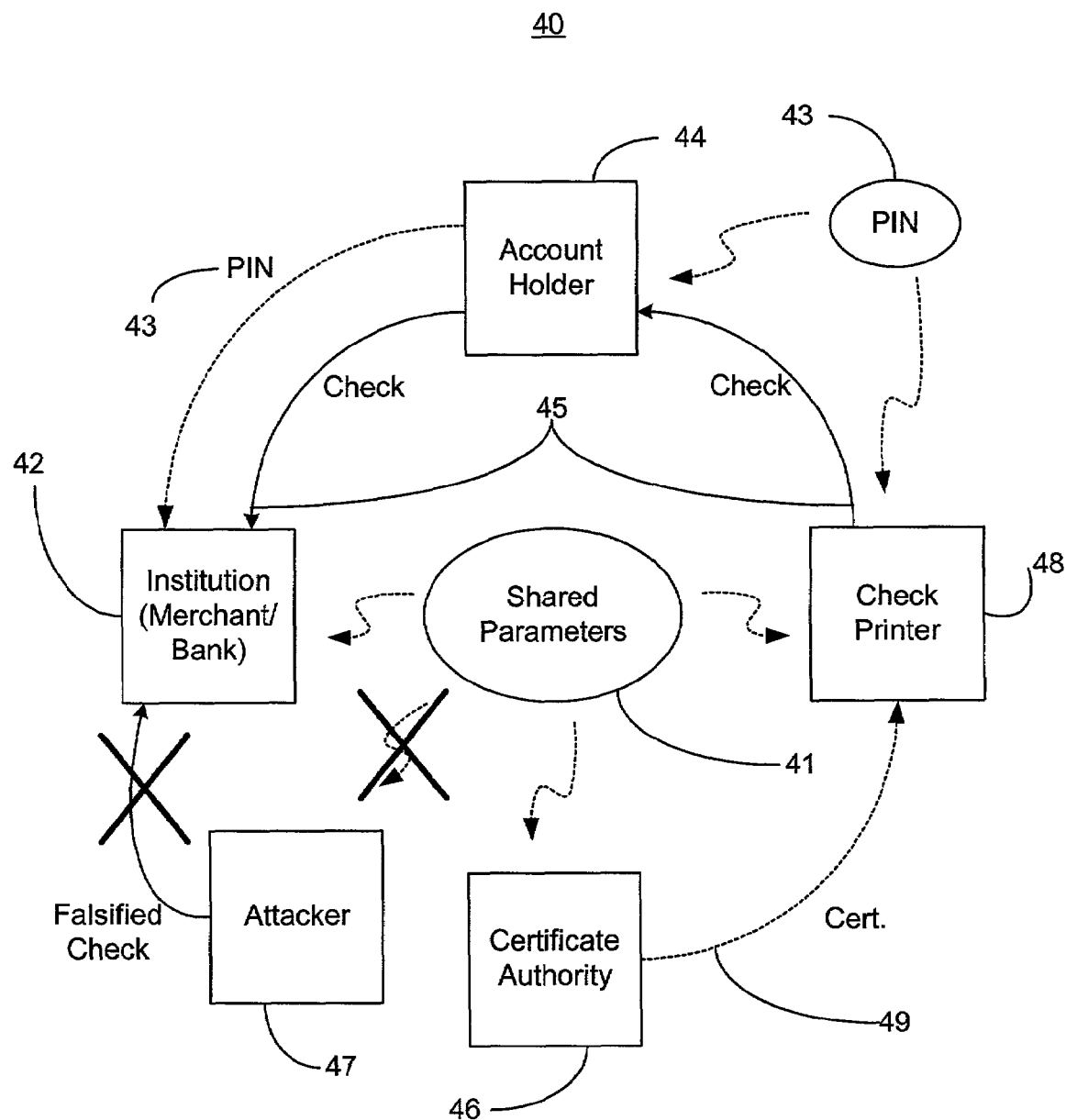
FIG. 2 shows a flow diagram of a preferred embodiment of an authentication scheme in accordance with the principles of the present invention.

Referring to FIG. 2, one aspect of a preferred embodiment of the authentication scheme of the present invention is shown generally at 40. As will be discussed in greater detail below, the authentication scheme 40 ultimately provides point of presentment institutions 42, such as merchants and banks, with a personal identification number (PIN)-based verification mechanism for personal checks and other personal identification documents. Thus, verification is possible according to the invention, by allowing an account holder 44 to present a personal value document such as a check 45 to an institution 42 along with a correct PIN 43 at the point of presentment. As will be discussed below, the authorization scheme 40 requires cooperation and a coordination of certain efforts between a certificate authority (CA) 46 and (preferably) a check printer 48. As part of this coordinated effort, certain shared parameters 41 and CA public key information must be defined and distributed in accordance with predetermined access requirements. Furthermore, the PIN 43 must be kept confidential. Nevertheless, it will be appreciated that in accordance with this preferred embodiment 40 of the authorization scheme of the present invention, a novel authentication system is presented that may be used by the point of presentment institution 42 in authenticating the checks 45. Again, as set forth above, it will be appreciated to those skilled in the art that although the preferred embodiment of the present invention is directed towards the processing of personal checks, digital signatures, certificates and the preferred PIN authentication system described herein may be used for authenticating many sorts of personal value or other personal identification documents (e.g., birth certificates, access control cards, credit cards, debit cards, drivers licenses, identity cards, passports, and Social Security cards) in which it is desired to authenticate the rightful owner of that document, and it is intended for such documents to be included in the spirit and scope of the present invention.

Figures 3, 4:
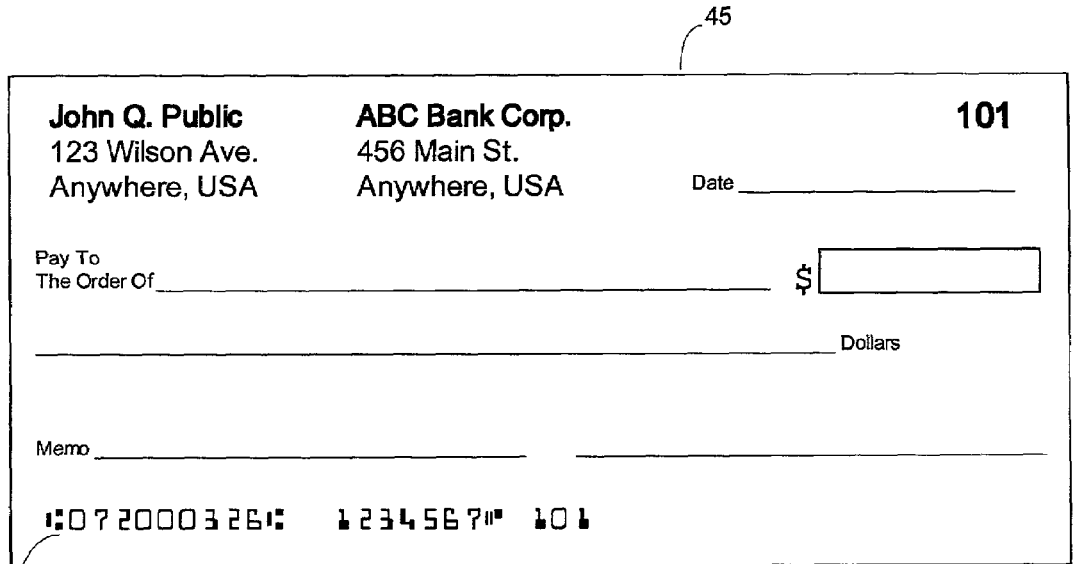
FIG. 3 is a known version of a personal check including a magnetic ink character recognition (MICR) line.
FIG. 4 shows one embodiment of an ECDSA-based short certificate format 50 that may be used in conjunction with a preferred embodiment of the authentication scheme of the present invention.

A. Personal Value Document Having Digital Signature 1 (Critical Document Data), Digital Signature 2 (Critical Document Data and PIN) and Public Key Certificate It is well known that a magnetic ink character recognition (MICR) code line 90 is printed on a personal check at the time blank check stock is personalized with account information. As known to those skilled in the art, this preprinted MICR code line currently always includes a routing number that identifies the account holder's financial institution, and may also generally include a customer's account number and a check serial number. Although not required to be so located, this MICR line 90 is usually found at the bottom of the personal check (FIG. 3).

Although it may be desirable to secure other data from a personal check transaction—e.g., the check amount, the payee and the transaction date—such data are typically not available when the check is printed, and are generally only available when the account holder 44 hand-writes the check at the point of purchase. In lieu of securing the check amount, payee, and/or transaction date, an alternative is to provide the institution 42 (or other acceptor of a personal check) assurance that the person writing the check is authorized to do so. This can be accomplished using the preferred embodiment of the authentication scheme 40 of the present invention, which will be now described 1. Critical Document Data In accordance with the preferred embodiment of the present invention, MICR code line 90 is designated as critical document data (FIG. 5). It is this critical document data that is targeted for enhanced security. (It will be appreciated that as there may be other data printed on a personal check 45 that are known at the time of printing, such as account name and address 92, which may are also be designated as part of that critical document data, and the scope of the present invention includes such data).

In one aspect of a preferred embodiment of this invention, the entire preprinted MICR code line 90, including the special symbols 91 and 93 that identify particular MICR fields, is designated "critical document data". As known to those skilled in the art, the symbol 91 is known as the routing symbol, which appears at the beginning and end of the transit field. The transit field includes the Federal Reserve district number and the financial institution number. The symbol 93 is known as the On-Us symbol and appears in the On-Us field. The serial number of the check for a personal sized check usually appears to the right of this symbol, while just to the left of this symbol usually appears the account number.

Optionally, ASCII text strings (e.g., those identifying the account holder's name and address 92 in a personal value document) can also be designated critical document data. (It is important to note that typically, digital signatures and the information they authenticate are accessible all at once; however, this need not be the case. The data string that a digital signature secures may be constructed from one or more different sources or locations (e.g., in the preferred embodiment of the present invention form ASCII text containing name and address 92 and the MICR line 90). As long as the digital signature and authentic public key succeed in verifying a data string, all standard conclusions follow—i.e., the data string was signed by the owner of the authentic public key used in the verification operation, and the content of the data string has not changed since the signature was issued.)

In accordance with another aspect of the preferred embodiment of the present invention, if such ASCII or other data is designated critical document data, it will need to be stored in machine-readable form on personal check 45 in a manner described in more detail in the forthcoming paragraphs. However, when the critical document data is simply the data that is stored in the MICR code line, there is no need to redundantly store this information in an alternate machine-readable format, as MICR characters are already machine-readable.

2. Authenticatable Data String

An authenticatable data string is defined herein as a check's critical document data appended with a PIN 43. This PIN 43, which is preferably four decimal digits, is represented as the corresponding four ASCII characters. The four ASCII characters representing the four decimal digit PIN 43 constitute four bytes of authenticatable data (preferably the final four bytes) (If desired, the PIN can be made longer for increased security against a PIN-guessing attack). The PIN 43 is private information, known only to the account holder 44, the check printer 48 (generally responsible for printing the account holders blank personal checks), and possibly the account holder's bank or other financial institution. PIN 43 may be selected by the account holder 44, or it may be a PIN that is selected for the account holder 44 by the printer 48. In either case, the check printer 48 knows the account holder's PIN 43. Any known method of PIN generation/assignment may be used in the present invention, and all such methods are intended to be included within the spirit and scope of same.

In one aspect of a preferred embodiment of the authentication scheme of the present invention, an independent check printer 48 is responsible for printing personal checks and other value documents for banks and financial institutions 42, for applying a digital signature to the authenticatable data string, and for affixing the digital signature and public key certificate to the value document (as discussed in more detail below). However, the financial institution on which the checks are drawn may itself print the value documents, apply a digital signature to the authenticatable data string, and affix the digital signature and public key certificate to the value document The following discussion will reference the check printer 48 as having responsibility for printing the financial institution's value documents; it will be appreciated that this is done solely for purposes of simplicity in understanding the invention, and is not intended to limit the scope of the invention.

3. Digital Signature Algorithms Applied to Critical Document Data String ("Digital Signature 1") and to Authenticatable Data String ("Digital Signature 2")

In the preferred embodiment of the present invention, the check printer 48 assembles the critical document data string, and then calculates a digital signature for the critical document data string (hereinafter, "digital signature 1") using the check printer's private signing key (discussed below). In addition, the check printer 48 assembles the authenticatable data string, and then calculates a second digital signature for the authenticatable data string (hereinafter, "digital signature 2") also using the check printer's private signing key (discussed below). Both digital signatures are then stored in machine-readable format along with that critical document data not already coded in the MICR line 90. The import of the use of two digital signatures will be discussed in more detail below.

Clearly, the smaller the data string stored in this bar code, the better. This is because the bar code will increase in size as more data is stored and because of the limited storage space availability on a personal check. Thus, in securing data on a personal check 45, a priority is placed on choosing a digital scheme that has the smallest key size for a given security level. The elliptic curve digital signature algorithm (ECDSA) currently offers the most security per binary bit of key material, and thus, although the present invention is not so limited, the ECDSA is the preferred digital signature method for the present invention above. The ECDSA digital signature method will be used to secure the authenticatable data string and as the preferred method of signing the short public key certificate 49 as described below.

a. Shared Parameters

Shared parameters define the underlying mathematical operations required to produce an ECDSA digital signature. Shared parameters 41 required for implementing an elliptic curve digital signature for the preferred embodiment of the document security data string are reviewed below. More specific and detailed descriptions of all parameter generation algorithms are set forth in the American National Standard X9.62, Public Key Cryptography for the Financial Services Industry: The Elliptic Curve Digital Signature Algorithm (ECDSA), 1998.

Referring again to FIG. 2, typically, a community of users will utilize the same ECDSA shared parameters 41, and thus these parameters 41 are common knowledge throughout the community of users. Shared parameter selection is performed once for a (possibly) large community of users. Once shared parameters 41 are defined, each entity wishing to issue digital signatures generates their own public/private key pair (using the shared parameters 41 to do so).

In order to produce a set of parameters 41 for the preferred embodiment of the present invention:

1. A suitable prime p and elliptic curve E defined over, $Z_p$ denoted $E(Z_p)$ are selected. Choosing a suitable elliptic curve $E(Z_p)$ means that integers a,b and prime p are chosen so that they and the set of x-y integer pairs that satisfy $y^2 \mod p = x^3 + ax + b \mod p$ have certain properties. The prime integer p is chosen so that $2^{160} < p < 2^{161}$. Integers a and b are chosen to meet certain mathematical requirements, one being that there is an prime integer n between $2^{160}$ and $2^{161}$ which divides the total number x-y pairs in $E(Z_p)$; and, 2. A point $P \in E(Z_p)$ of order n is then selected. A point $P \in E(Z_p)$ has order n if and only if n is the smallest number such that P added to itself n+1 times (using the special elliptic curve addition operation) is equal to P.

The elliptic curve E, the point $P \in E(Z_p)$, and n are shared parameters 41 shared by the community of users authorized to use this invention, which may in the case of a personal check 45, include account holder 44, check printer 48, and bank or financial institution 42. The parameter selection as discussed above is compatible with an ECDSA digital signature scheme.

i. Shared Parameter Distribution

As discussed earlier, shared parameters 41 define the underlying mathematical operations that make elliptic curve digital signatures possible. All entities involved in the security process; i.e., the certificate authority, check printing companies, merchants, banks, and other authorized participants need access to these shared parameters 41. Access to the shared parameters 41 should be restricted to authorized participants only, however.

Although digital signatures are secure no matter who gains access to shared parameters 41, a PIN number guessing attack is possible when potential attackers 47 have access to the shared parameters 41. If the attacker 47 knows all shared parameters 41, then he can implement verification software much like what may be available at participating merchant stations. Then, the attacker 47 can take a bar coded check 45, retrieve the bar code information, and repeatedly guess the PIN until he finds the correct one (requiring on average 5,000 tries when four digit PINs are used). Table 1 documents recommended parameter access according to a preferred embodiment of the invention. An attacker 47 who does not know E, n and/or P cannot mount a PIN number guessing attack.

TABLE 1

| Parameter access table | | |
|---|---|---|
| Unrestricted access: publicly available | Restricted access: known to all participants (check printers, CA, banks and merchants) | Strictly private: known only to owner |
| CA and printer public keys | Shared parameters: E(i.e., a, b, p); n, P | Private signing keys: CA and check printer private keys | b. Elliptic Curve DSA Key Generation

Once a suitable set of shared parameters 41 are selected, public/private key pairs used to create the digital signature can be generated. All key pairs function in the context of the overall mathematical group defined by the shared parameters 41. To produce a key pair, the following steps are carried out:

1. A statistically unique and unpredictable integer d in the interval [2, n−2] is selected;

2. Q=dP=P+P+ . . . P is computed. (That is, elliptic curve addition is used to add P to itself d times); and, 3. The outputs are determined as follows: The complete public key is Q; the private key is d.

Since the shared parameters 41 {E, P, n} are widely distributed among the authorized community of users (merchants, banks, check printers, etc.), only Q need be reported as the public key. (Q is actually an ordered pair of integers (x,y), which satisfy $y^2 \mod p = x^3 + ax + b \mod p$. Thus, if x is known, one can calculate $y^2$ using the elliptic curve equation.)

There are two square roots of $y^2 \mod p$. These two square roots are easily calculated—furthermore, one root will be even and the other will be odd. Since the two square roots of $y^2 \mod p$ can be calculated, the public key Q=(x,y) can be stored as only x, plus one bit. The extra one bit indicates whether the correct square root of $y^2$ mod p is even or odd. Using this technique, and when E and n are sized as specified, it is possible to store a public key in 22 or fewer bytes—21 bytes store x, and one additional byte stores the required extra bit. The companion parameter, y, is derived from the elliptic curve equation $y^2$ mod $p=x^3+ax+b$ mod p and the stored extra bit. As the private key is simply an integer between 1 and n−1, a private key may be stored in 21 or fewer bytes. The importance of this will be understood in the forthcoming paragraphs.

c. Elliptic Curve DSA (ECDSA) Digital Signature

Inputs to this process are the shared parameters 41 {E,P, n}, and the private signing key d. When signing a message M, the following steps are effected:

1. A random integer k in the interval [2,n−2] is selected;
2. $kP=(x_1,y_1)$ and $r=x_1$ mod n are computed. If r=0, then go to step 1;
3. $k^{-1}$ mod n is computed;
4. $s=k^{-1}$ h(m)+dr mod n is computed, where h is the secure hash function known as SHA-1 (as known to those skilled in the art, SHA-1 is a known hash algorithm designed to avoid collision. SHA-1 produces 160 bit message bytes, and thus a message of arbitrary length always maps to a message digest or hash of 160-bit length);
5. If s=0 then go to step 1; and,
6. Determine the digital signature for the message M, which is the pair of integers (r,s).

Using shared parameters 41 {E,n,P} sized as recommended for the preferred embodiment of this invention, r and scan each be represented in 21 (8 bit) bytes (because 0<r, $s<n<2^{161}$). Thus, in the preferred embodiment of the present invention, a digital signature, hereinafter, "digital signature 1", may be 42 bytes in length.

4. Public Key Certificate

As set forth above, verifications of a digital signature using a public key of unknown origin does not necessarily prove origin or data integrity. In order to achieve true origin non-repudiation, public keys must be provably linked to the true public key owner. In the preferred embodiment of this invention, a short public key certificate 49 is used to provide true origin non-repudiation. As described below, this short certificate 49 is included within the data that is encoded in a machine-readable format.

a. Certificate Authority 46

In the preferred embodiments of this invention, a single third party trusted by all participants in the authentication system of the present invention preferably serves as the certificate authority (CA) 46; i.e., the party that issues all the ECDSA certificates described in mode detail below. In the simplest and preferred embodiment of the authentication system of present invention, the CA 46 will produce a key pair and sign certificates all in the context of an elliptic curve group defined for all users of the systems. That is, a single elliptic curve group defines the digital signature operation for all participants, including the CA 46. (The CA 46 could produce a separate set of shared parameters to define a different elliptic curve group for issuing digital signatures appearing in public key certificates. Utilizing a different elliptic curve group in issuing public key certificates results in the higher mathematical strength of such digital signatures as compared with those digital signatures used to secure individual bar code stings. This might be useful, for example, in those instances where it is desired that the public key certificate have a longer period of validity than the digital signature for the bar code string on a personal check (which, might have a validity period of only one year, for example). This extra set of elliptic curve parameters could be circulated to all participants, embedded in software, or otherwise provided as loadable data. This data could be authenticated by the participants in some manner at the time of the parameters' retrieval and use.)

Using the set of common shared parameters 41 which define the basic elliptic curve operations, the CA 46 generates a public/private key pair. The private key portion of the pair issues all digital signatures inside the public key certificate, and is kept under strict control by CA 46. Only the CA 46 can issue valid certificates since the private key required for public key certificate signature is held exclusively by the CA 46. The CA's public key validates all public key certificate signatures and is distributed with all shared parameters to all participants involved b. Certificate Data Fields In the preferred embodiment, public key certificate 49 issued by CA 46 comprises 8 certificate data fields. Referring to FIG. 4, the first data field 51 in the certificate 49 indicates the total number of bytes the certificate contains. For convenience, call this number m. The second field 52 is a two-byte version number that indicates the particular format for a certificate style. Inclusion of a format version number may be desired in those cases where backward compatibility is desired between value documents (or series of value documents) having different bar code data string 60 formats (i.e., having different data included in the bar code data string 60) printed thereon. The format number will provide instructions to the document reader as to how the data in the bar code string 60 should be parsed (discussed in more detail below). By way of example, and not limitation, as seen in Table 1, below, the version number for a first-issued digital certificate may be Version 0 (i.e., version number set equal to 0). This version may reflect the bar code data string 60 format shown in FIG. 6. Should a later value document (or series of value documents) have a different bar code data string 60 format (e.g., include a field for driver's license number, Social Security number, telephone/fax/pager number, or other data field), the second field of the certificate format may be altered to Version 1, which will instruct the document reader on the manner in which the bar code data should be parsed.

After the version number, the next 4 bytes, or data field 53, will store a binary representation of a certificate serial number. For a given version number, over 4.2 billion distinct certificate numbers may be issued. A serial number will assist in identifying and tracking certificates. Serial numbers can serve as an index into a consolidated database of all certificates issued. In fact, they can facilitate standard key management tasks such as key revocation.

Preferably, though not mandatory, two validity dates are stored in data fields 54 and 55: The first is the date when the certificate becomes valid (54); the second is the date when the certificate expires and is no longer valid (55). Both dates are represented as decimal numbers, wherein the left-most two digits represent the month (i.e., 1–12), the second pair of digits represents the day of the month (e.g., 04 for April), and the last four digits represent the year. The resulting decimal number is then coded as an unsigned binary integer, where the most significant binary digit appears on the left. For example, the date Dec. 31, 3000 would be represented as the decimal number 12313000. Converting this decimal number to binary where the most significant bit is on the left, one finds that 12313000 is equivalent to:

1011 1011 1110 0001 1010 1000.

The next data field 56 indicates the public key belonging to the owner identified in the data field 57. A public key is actually an ordered pair (xp,yp) belonging to $E(Z_p)$. In a preferred embodiment of the present invention, this public key is stored in 22 bytes as follows in conformance with ANS X9.62. The integer xp is less than $2^{161}$, and so can be represented in 161 binary bits. Convert xp into a 21-byte string of 8 bit integers $M_1, M_2, K, M_{21}$. This 21-byte string should satisfy the following equation:

$$\sum_{i=1}^{21} 2^{8(21-i)} M_i = xp.$$

It should be noted that since $xp<2^{161}$, $M_1$ is either 00000001 or 00000000. If yp is even, then append to the left of the string $M_1 \wedge M_{21}$ the additional byte 00000010. On the other hand, if yp is odd, then append to the left the byte 00000011. This method of storing (xp,yp) is consistent with the ANSI X9.62 standard for implementing elliptic curve DSA.

The next data byte field 57 contains z, the number of characters in the ASCII character string that identifies the owner of the public key stored in the certificate 49. This character string is preferably limited to no more than 256 bytes, and would typically be 20 to 40 bytes in length. This character string should specifically identify the company or individual that owns and controls the private key corresponding to the public key stored in the certificate 49.

In addition to storing the number of bytes in the first byte of the field reserved for the name/address of the public key holder, the actual ASCII character string of length $\alpha$m−77 is also stored. This number is derived by subtracting from the total byte-length of the certificate, m, the byte-length of the remainder of the certificate, excluding the bytes that comprise the name/address of the key owner, $\alpha$. As seen in FIG. 4, this is 77 bytes). The key owner name/address is stored as expected—the first character in the string corresponds to the first character in the owner name and the last character in the string is the $\alpha^{th}$ character in the name/address.

The final field 58 of the certificate 49 contains the certificate authority's digital signature on all previous fields in the certificate 49. The certificate authority's digital signature is composed of two integers r and s. In the preferred embodiment of this invention, the positive integers r and s which comprise the certificate authority signature are less than $2^{161}$. The signature (r,s) is stored from left to right as a sequence of 1-byte integers $c_1 \ldots c_{42}$ satisfying:

$$\sum_{i=1}^{21} 2^{8(21-i)} c_i = r$$

and, $$\sum_{i=22}^{42} 2^{8(42-i)} c_i = s$$

Each byte $c_i$ is preferably a 1-byte integer where the most significant bit is stored on the left.

B. Alternate Embodiments of Personal Value Document including either Digital Signature 1 or Digital Signature 2, and Public Key Certificate Although a personal value document according to the present invention preferably includes both digital signatures 1 and 2, it will be appreciated that the size of the bar code and the space available on the personal value document may be of such importance that the use of only one digital signature is desired and/or possible. In such a case, either digital signature 1 or 2 may be used by itself.

In general, if only one digital signature is to be used, preference will be given to use of only digital signature 2, as this digital signature includes a PIN, and a financial institution that has knowledge of the shared parameters (explained in more detail below) may still verify the digital signature by computing all combinations of PIN entries and applying same to the document to validate same (as set forth in more detail below). However, digital signature 1 might be sufficient in certain circumstances; for example, where a customer or other user generates his own checks using a computer and software residing thereon. In such a case the format of the MICR line is controlled by software. If the payee name, amount, and date of issue are available, the user/customer might digitally sign that information using only digital signature 1. Another case might involve the instance where a printer currently does not have the capability of issuing and controlling PINs, and might wish to thus provide only digital signature 1 until a later time when it is able to issue PINs. All of these embodiments are within the scope and spirit of the present invention.

C. Commercial Value Document Having Digital Signature 1 (Critical Document Data) and Public Key Certificate In some instances, instead of presenting a personal check at a point of purchase, an account holder 44 may instead present a commercial value document, such as a bank check or business check. In this latter instance, although it would be desirable to be able to verify that the account holder 44 presenting the commercial value document was in fact the payee indicated on the face of the commercial value document by having him enter a unique PIN (cf., having the authority to write a personal check in the embodiment above), it would be technically infeasible for a financial institution to assign a PIN and complete the aforementioned authentication scheme for each customer to whom it issues such a commercial value document. However, it would still be desirable if the person or entity receiving the commercial value document from account holder 44, to be able to verify that the commercial value document has not been tampered with since leaving the bank/financial institution. The alternate embodiment of the authentication scheme of the present invention is directed to those instances where it is desired to verify a commercial value document.

In this alternate embodiment, only "digital signature 1" is affixed by printer 48 to the commercial value document. In the case of a commercial or other business value document, it will be appreciated that, in addition to the MICR code, the critical document data might include ASCII text strings 92 (e.g., the financial institution or business' name and address, or perhaps, even the payee's name, the amount, and the date of issue)(FIG. 3). The method for applying this digital signature to the critical document data is preferably the same as set forth above, and, again, the ECDSA digital signature algorithm is preferably used. Similarly, the public key certificate format and the manner in which it is applied to the value document is preferably the same as that previously discussed; however, in the case of a commercial value document, the public key that is certified by CA 46, and which is printed on the commercial value document, is the public key of the issuer of the commercial value document. Thus, referring to FIG. 4, data field 56 includes the data for the public key, and data field 57 comprises the name of the owner of the public key that issued the commercial value document.

C. Two-Dimensional Bar Code Format

Referring now to FIG. 5, as set forth above, the critical document data (other than what is contained in the MICR code line 90 (such as the account holder's name or address for personal value documents)), the digital signature for the authenticatable data string (or critical document data for the alternate embodiment as discussed immediately above), and the public key certificate 49 containing the check printer's public key 49 (or check issuer's key), are all stored in a machine-readable format on personal check 45 (or other personal or commercial document). Importantly, however, PIN 43 is not stored anywhere on the check 45. Again, referring to FIG. 5, when the critical document data is simply the data that is stored in the MICR code line 90, there is no need to redundantly store this information in an alternate machine-readable format, as MICR characters are already machine-readable. However, any critical document data not already stored in the MICR code line 90 may be stored on the document, preferably in a manner as described below.

All such critical document data is preferably stored in a PDF 417 two-dimensional bar code 60 printed on the face of the check, to the left of the signature line, just above the MICR code line 90 and the MICR clear band, which is a 0.625-inch high horizontal band located above the lower edge of the check (FIG. 5). The width of the two dimensional bar code on personal checks is preferably approximately three inches, and on commercial checks it may be as long as five inches. The height of the bar code is based on the bar code element size and the number of data bytes contained within, though it will be understood that the dimensions and location of the bar code are not so limited. Other data may be stored in this bar code 60 as well. As known to those skilled in the art, many software tool kits are available for creating PDF 417 bar codes from given ASCII or binary data. Software toolkits are also available to assist in developing bar code reading applications using black and white or gray scale document images.

PDF 417 bar codes are composed of rows of element blocks. Each row is composed of columns of modules, each 17-element-blocks wide. An element block, which is 0.013 inches wide and 0.018 inches tall, produces a bar code that is easily read from standard 200 or 240 dot per inch gray-scale images. Importantly, many check sorters on the market today are capable of imaging a check bar code at this quality level. The bar code element size can be adjusted to facilitate reading printed bar codes from black and white images (as opposed to gray-scale) and/or from images that are of lower or higher resolution. PDF 417 bar codes readable from 200 or 240 dot per inch gray-scale images can store approximately 200 data bytes per square inch of bar code area.

It will be appreciated to those skilled in the art that other means of storing machine-readable information on the document can be utilized as an alternative to PDF 417 such as Data Matrix, MaxiCode, Astec, or Data Glyphs. All such methods of storing machine-readable information, and similar methods, are intended to be within the spirit and scope of the present invention.

a. Bar Code Data

As seen in FIG. 6, data in the bar code is preferably composed of four required fields (61, 62, 63, 64,), plus one or both optional fields (65, 66). The first 2-byte field 61 contains an integer, k, indicating the total number of bytes in the bar code. The second field 62 contains an m-byte certificate 49 issued by CA 46 as described above. The third field 63 contains the number of bytes 1 in the critical document data field, and the fourth field 64, contains the actual critical document data bytes. The fifth field 65, if present, contains 42 bytes reserved for digital signature 2 (21 bytes each for integers r and s), while the sixth 42-byte field 66, if present is used for digital signature 1 (described above).

b. Process for Creating Bar Code Data

According to one aspect of a preferred embodiment of the authentication system of the present invention, check-printing companies that print personal check stock would be responsible for producing the bar-coded checks for personal check users. Again, as discussed above, if the financial institution on which the checks are drawn prints personal checks, then the financial institution would be responsible for producing the bar-coded checks. Similarly, in the case of commercial value documents, the entity responsible for printing the commercial value documents (e.g., a separate printing company or the issuer of the value document itself) also would be responsible for producing the bar-coded documents.

Before producing bar coded checks, the check printer 48 must generate a public/private key pair (in accordance with the preferred method of digital signature creation set forth above), and then obtain a certificate from the CA 46 for that public key. A valid certificate is one that is signed by the designated CA 46.

Figure 7:
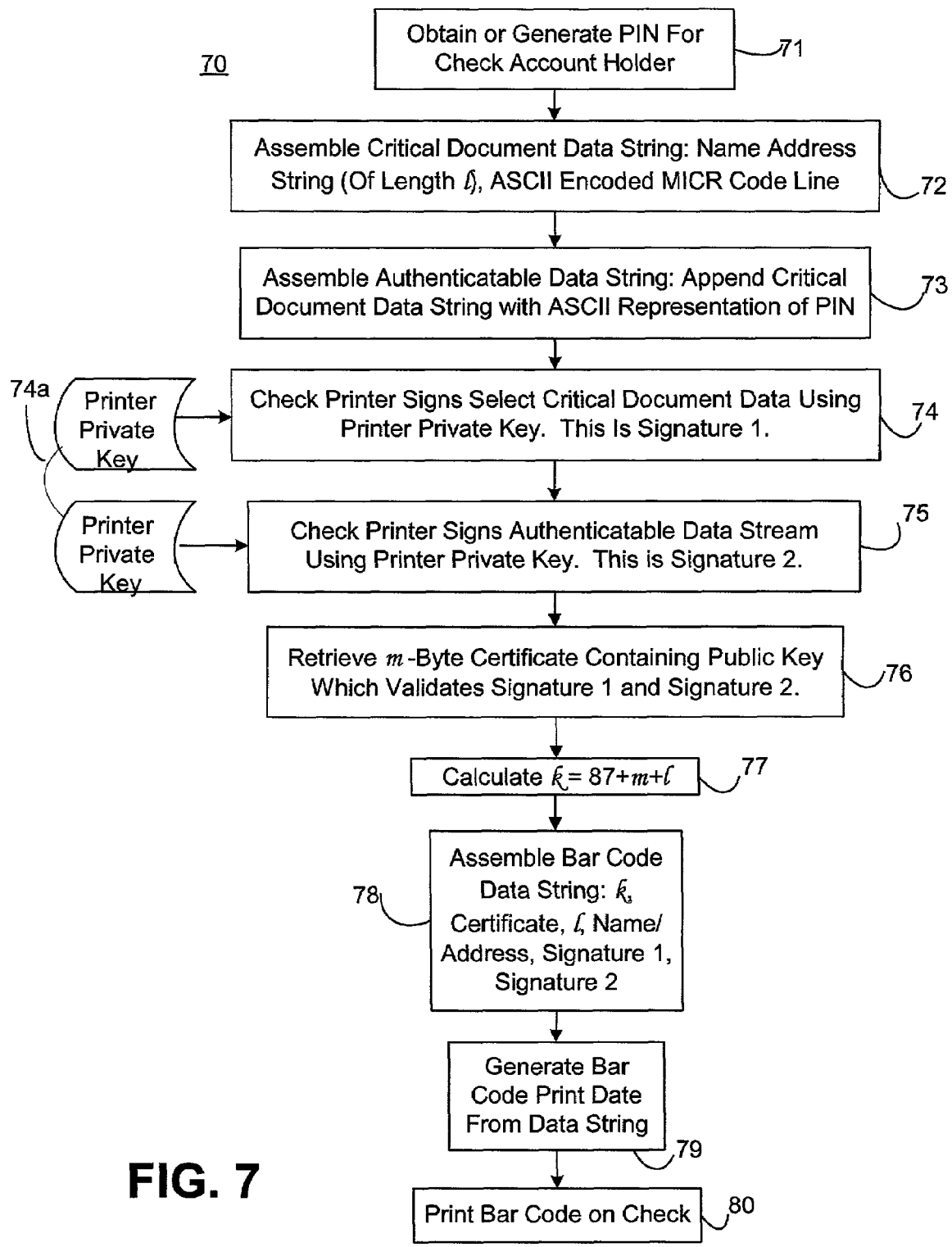
FIG. 7 is a flowchart of a preferred method for printing authentication data and digital signature information on a value document in accordance with a preferred embodiment of the present invention.

An example of a preferred embodiment for printing authentication data and digital signature information on a personal value document may be seen by referring to FIG. 7, wherein both digital signatures 1 and 2 are to be printed on the value document. Once the check printer has received from CA 46 a valid certificate, it executes the following method 70 for printing a bar coded check or other value document (i.e. in fixing the digital signature(s) and the public key certificate to the document):

1. At step 71, the check printer 48 will either randomly generate or be provided (by the customer) with a four digit PIN to be used by the customer to authenticate him/herself. In either case, this PIN is also preferably forwarded to the account holder 44 for use with his/her checks.

2. At the personalization stage of check printing, i.e., the stage when all personal information for a particular account holder is printed on blank personal check stock, the check printer first assembles the l ASCII encoded characters representing the account holder's name and address (step 72). The l-byte array representing the account name and address stores this information as ASCII representations in their natural order. The name and address string (if present) will be generally be the same as what is printed in standard print on the face of the check. The first character of the array is the first character of the account holder's name, and the last character of the array is the $l^{th}$ character of the account holder name and address. If the account name and/or address is not recorded, then l is set equal to zero. The check printer appends an ASCII character string representing the MICR code line of a check to the l bytes representing the account name and address. The resulting character string at step 72 is the ASCII representation of critical document data, the "critical document data string".

3. In the case of personal check 45, or similar personal value document, the ASCII string representing the account holder's PIN is then appended to the critical document data string at step 73. The resulting string is the "authenticatable data string".

4. At step 74, the check printer 48 applies its private key from 74a to produce a digital signature $(r_1, s_1)$ or digital signature 1. Again, digital signature 1 is applied only to the critical document data string. Digital signature 1 $(r_1, s_1)$ is then stored in the bar code from left to right as a sequence of 1-byte integers $d_1 \ldots d_{42}$ satisfying:

$$\sum_{i=1}^{21} 2^{8(21-i)} d_i = r_1, \text{ and}$$

$$\sum_{i=22}^{42} 2^{8(42-i)} d_i = s_1$$

5. At step 75, in the case of personal value documents, the check printer applies its private key from 74a to the authenticatable data string to produce digital signature 2. As set forth above, digital signature 2 comprises a pair of integers: $(r_2, s_2)$. The digital signature $(r_2, S_2)$ is stored in the bar code from left to right as a sequence of 1-byte integers $c_1 \ldots c_{42}$ satisfying:

$$\sum_{i=1}^{21} 2^{8(21-i)} c_i = r_2 \text{ and}$$

$$\sum_{i=22}^{42} 2^{8(42-i)} c_i = s_2$$

Figure 7A:
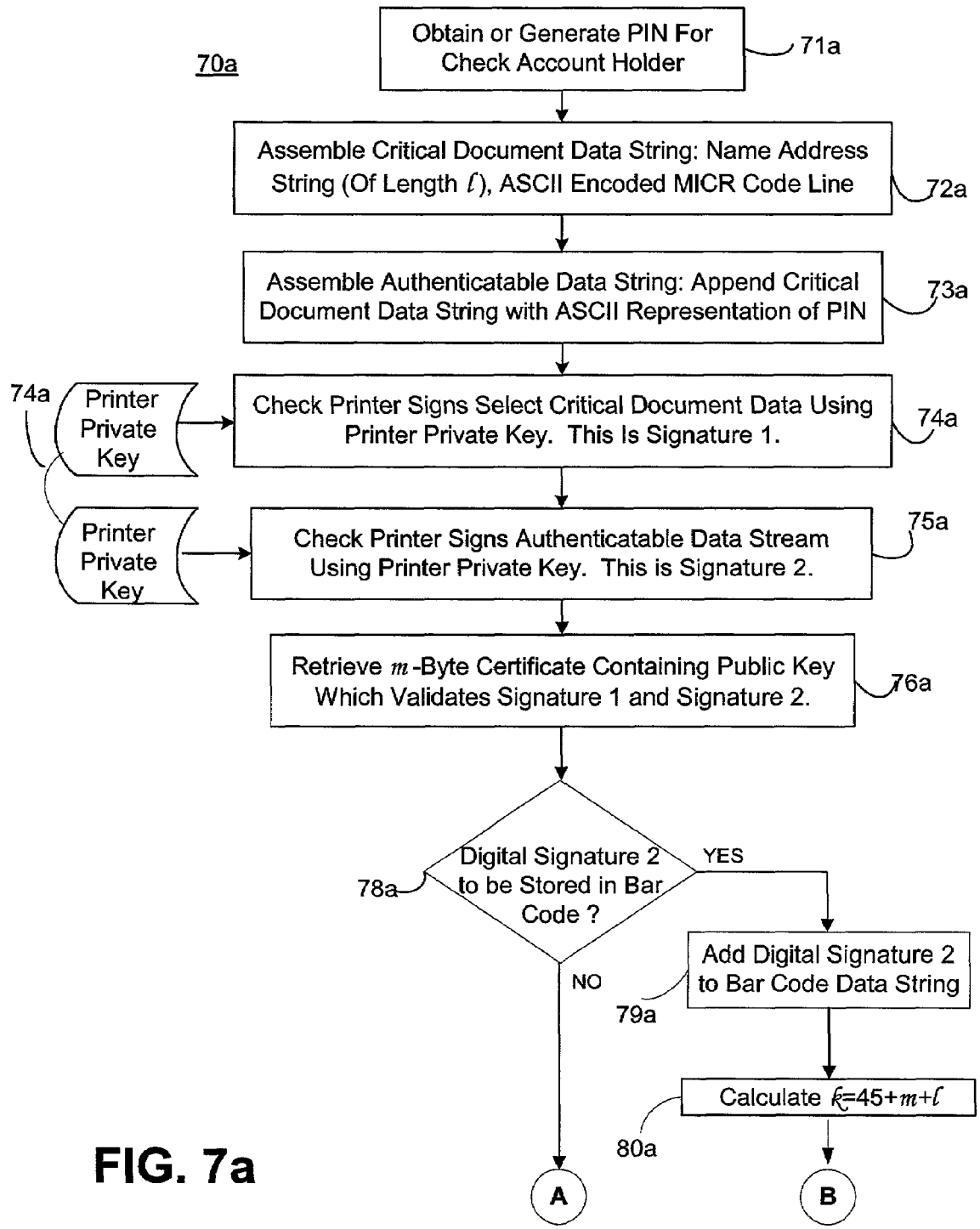
FIG. 7a is a flowchart of an alternate method for printing authentication data and digital signature information on a value document in accordance with a preferred embodiment of the present invention.
Figure 7A:
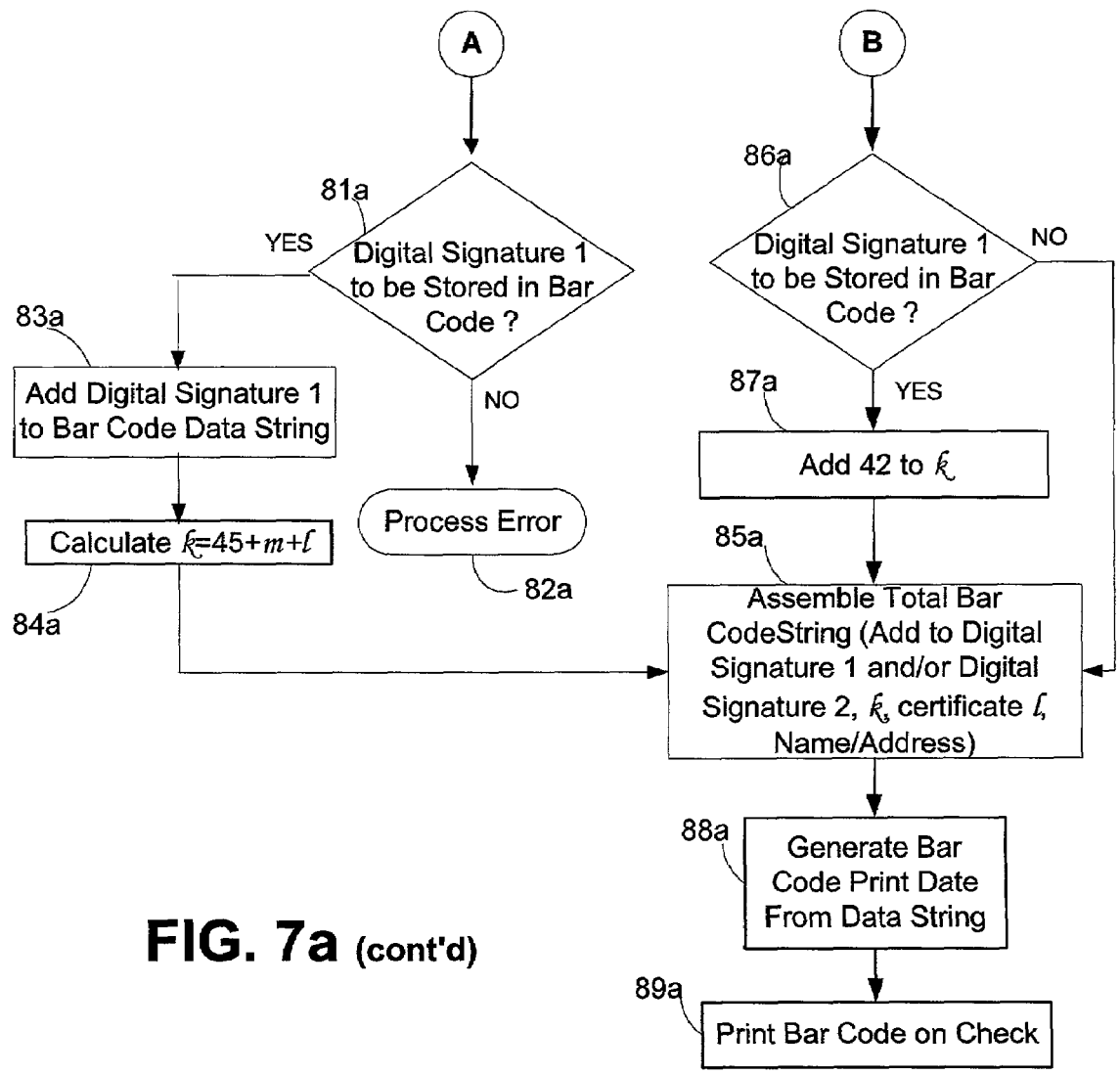

6. The m-byte certificate issued by CA 46 containing the public key that validates both digital signatures 1 and 2 is then retrieved (step 76).
7. At step 77, the check printer calculates k, the total number of bytes to be stored in the bar code data string, where k=87+m+l (The number m is the number of bytes in the certificate retrieved at step 76, and l is the length of the account holder's name and address string.)
8. At step 78, the bar code data is assembled into a k byte string. Again, it is noted that the MICR code line 90 is not stored in the array of data, again, because the MICR code line 90 is already stored on the document in a machine-readable format.
9. At steps 79 and 80, the check printer 48 preferably generates bar code print date from the data string and prints an approximately 3 inch wide PDF 417 bar code in a convenient location on the face of each protected check, preferably on the face of the check in the lower left corner. All other standard personalization information is printed as well, including the MICR code line and the (human readable) account holder name and address fields on the check An alternate embodiment for printing authentication data and digital signature information on a personal value document is shown in FIG. 7a. It is expected that this method will be carried out for commercial value documents, and in the case where the space available on the personal value document may be of such importance that the use of only one digital signature is desired and/or possible, and thus only one of digital signatures 1 or 2 will be printed on the document. However, it will be appreciated that the alternate method of FIG. 7a is not so limited and also may be used, for example, in the case where both digital signatures are to be printed on the personal value document.

As seen in FIG. 7a, steps 71a through 76a are substantially identical to steps 71 to 76 of FIG. 7. Once the m-byte certificate is retrieved at step 76a, the following steps are then effected:

1. If it is determined at step 78a that digital signature 2 is to be stored in the bar code printed on the value document, then the method proceeds to step 79a where digital signature 2 is added to the bar code. k is then calculated at step 80a according to the equation k=45+ m+l.
2. If digital signature 2 is not to be stored, then the process skips to step 81a, where the method queries whether digital signature 1 is to be stored in the bar code printed on the value document (e.g., in the case of a commercial value document).
   a. If digital signature 1 is not to be stored either, an error has occurred and the process stops 82a.
   b. If digital signature 1 is to be stored, the method proceeds to step 83a where digital signature 1 is added to the bar code string. k is then calculated at step according to the equation k=45+m+l at step 84a. Similar to the method shown in FIG. 7, at step 85a, the bar code data is assembled into a k byte string (including k, certificate l, Name/Address, and digital signature 1)
3. If digital signature 2 is to be stored, then the process instead proceeds to step 86a, where the method queries whether digital signature 1 is to be stored in the bar code printed on the value document.
   a. If digital signature 1 is not to be stored, then the method proceeds to step 85a where the bar code data is assembled into a k byte string (including k, certificate l, Name/Address, and digital signature 2)
   b. If digital signature 1 is to be stored also, then the method proceeds to step 87a where k is incremented by 42. The method then proceeds to step 85a where the bar code data is assembled into a k byte string (including k, certificate l, Name/Address, digital signature 1 and digital signature 2)
4. After step 85a, the bar code data is assembled into a k byte string (including k, certificate l, Name/Address, digital signature 1 and/or digital signature 2,) at step 87.
5. Similar to the method shown in FIG. 7, at steps 88a and 89a, the check printer 48 preferably generates bar code print date from the data string and prints an approximately 3 inch wide PDF 417 bar code in a convenient location on the face of each protected check, preferably on the face of the check in the lower left corner. All other standard personalization information is printed as well, including the MICR code line and the (human readable) account holder name and address fields on the check It will be appreciated that since digital signature 2 is preferred in the cases where only one digital signature is going to be printed on a value document (for the reasons set forth above), its addition to the value document is preferably queried prior to that of digital signature 1. However, the placement of the two queries within the method may be interchanged without departing from the scope and spirit of the invention. In fact, in yet another embodiment, in the case of commercial value documents, it is likely that only the query for digital signature 1 will be necessary, so that a query for digital signature 2 (steps 81–83) may be absent from the method set forth in FIG. 7a.

III. Validating a Bar Coded Value Document at the Point of Purchase

A. Payment System for Reading Value Documents

In a preferred embodiment of the present invention, participating merchants, banks, and the like will equip each teller or cashier station with a check reading system 100 that can preferably read the MICR code line on personal and commercial checks, retrieve the machine-readable critical document data and machine-readable security data from a such checks, produce a 200 or 240 dot per inch gray scale image of the region of the check where the bar code is printed, and can accept a PIN number input from customers tendering a personal check. A preferred embodiment of the check reading system 100 may be seen in FIG. 8.

Figure 8:
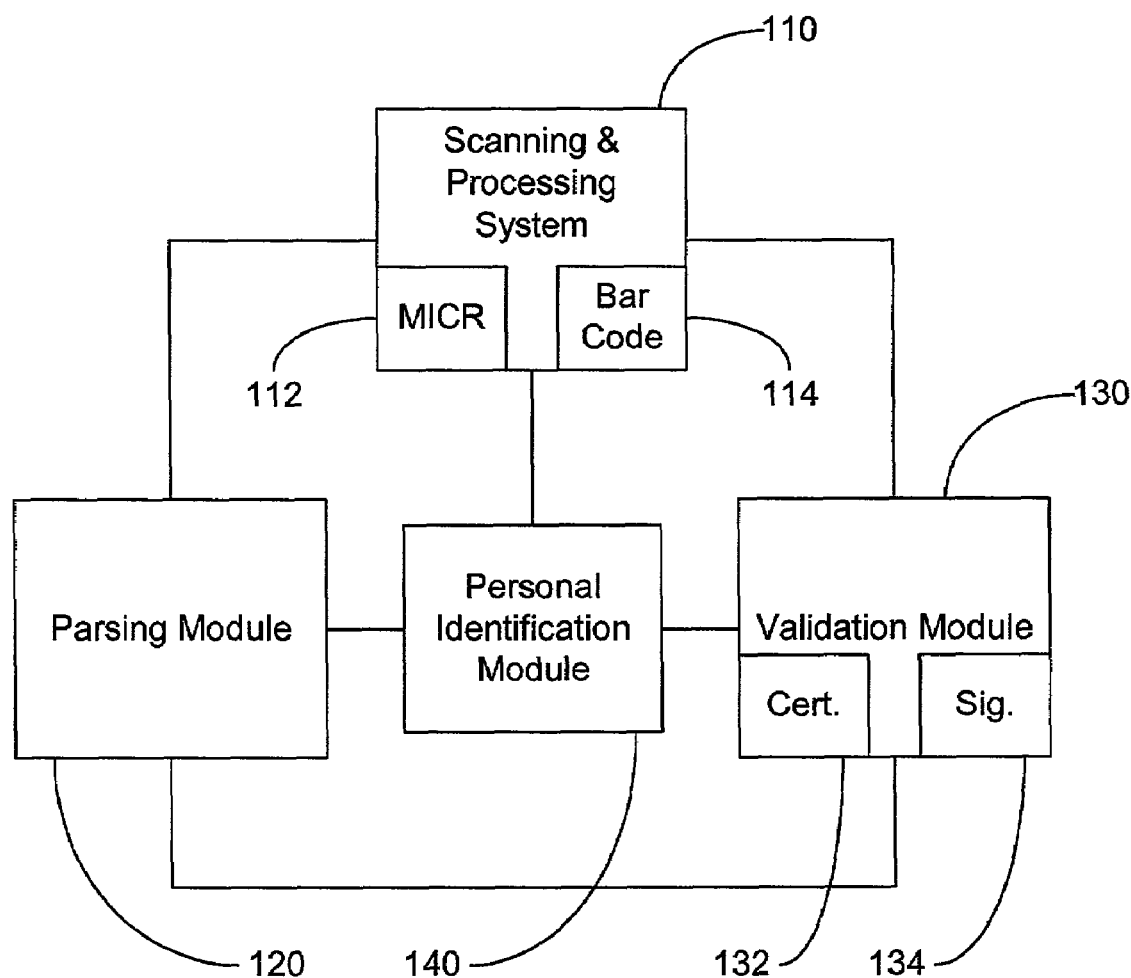
FIG. 8 is a block diagram of a preferred embodiment of the payment system in accordance with the principals of the present invention.

It can be seen in FIG. 8, the check reader 100 includes an image scanning and a processing system 110, a parsing module 120, a validation module 130, and a personal identification module 140 for receiving the PIN from the presenter of the document (e.g., account holder 44 or attacker 47).

The image scanning and processing system 110 includes a MICR reader subsystem 112 for retrieving the critical document data from a MICR code line contained on the document and a bar code reader subsystem 114 for retrieving the security data from the two-dimensional bar code printed on the document. As will be discussed below, the parsing module 120 preferably parses (or extracts) the bar code data bytes to obtain other critical document data, the public key certificate, and the digital signature. After the personal identification module 140 receives the PIN from the document presenter, the image scanning system 110 assembles the authenticatable data string based on the PIN. Alternate image scanners that produce higher or lower quality images may be used at merchant stations by coordinating the size of the machine-readable bar code elements with the scanner resolution. For instance, two and one-half to three scanner samples are generally required to resolve the width of one bar code element. As a result, for lower resolution scanners than 200 dpi, the bar code elements must be greater than 0.013 inch wide.

Validation module 130 includes a certificate validation submodule 132, and a digital signature validation submodule 134, and is used to validate the digital signature based on the public key certificate and the authenticatable data string. It will be appreciated that though certificate validation submodule 132, and digital signature validation submodule 134 are preferably separate submodules, they need not be so, and their function may be combined in one submodule.

The certificate validation submodule 132 validates the public key certificate based on the CA public key, where the public key certificate contains the authentic public key of the check printer 48. The digital signature validation submodule 134 validates the digital signature based on the authentic public key of check printer 48 and the authenticatable data string.

B. Verifying a Check at a Point of Purchase

Figure 9:
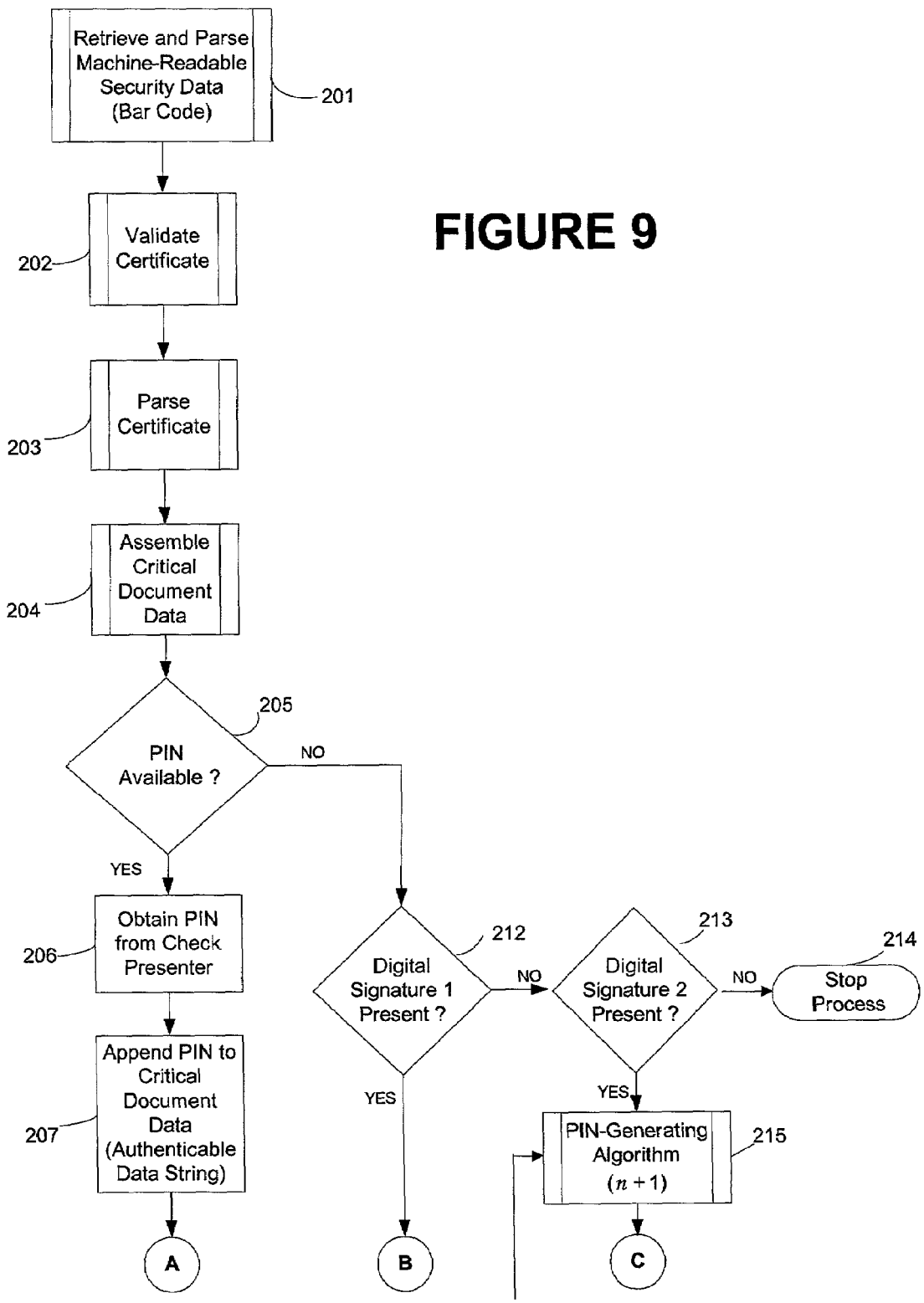
FIG. 9 is a flowchart of a method for authenticating a value document in accordance with a preferred embodiment of the present invention.
Figure 9:
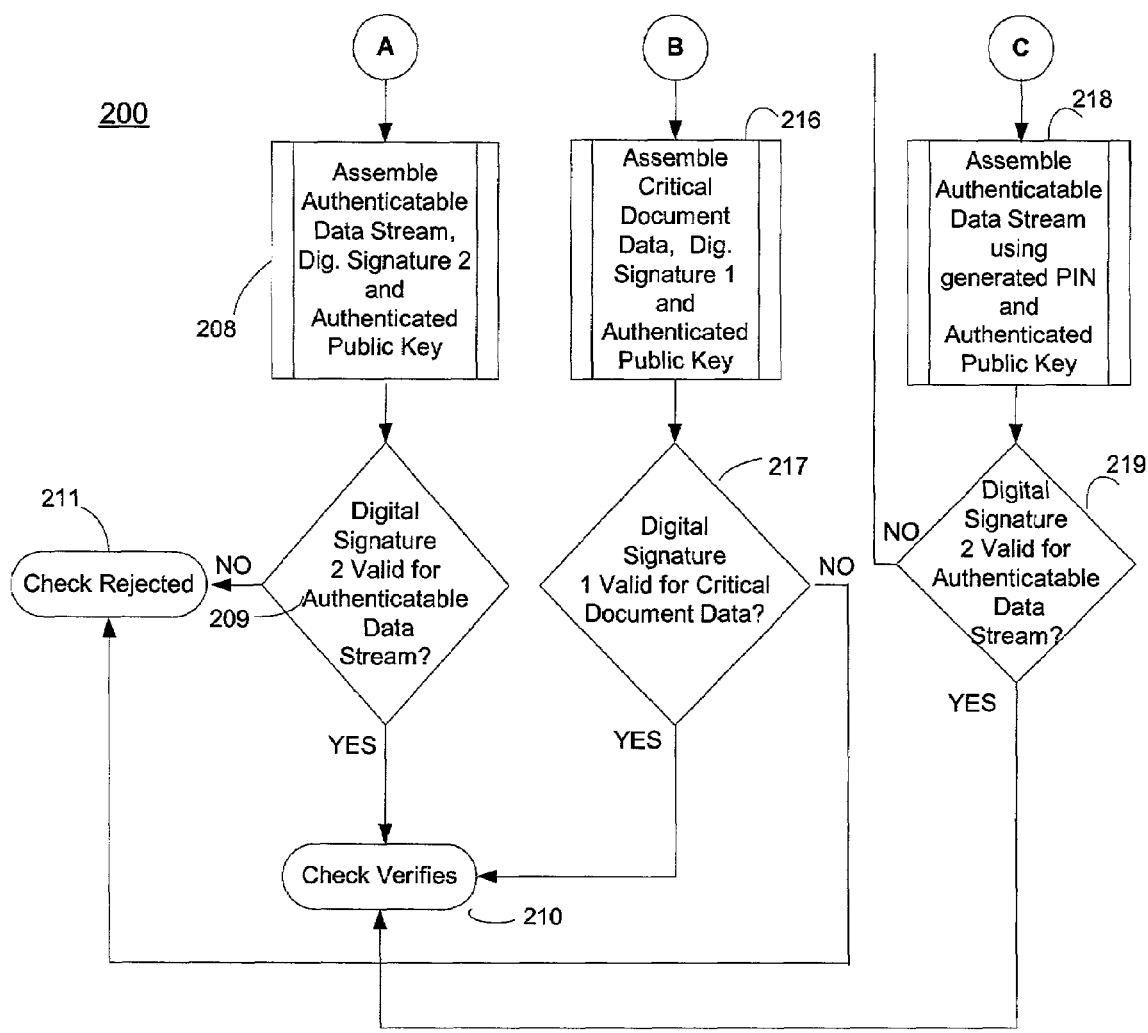

As seen in FIG. 9, the verification 200 of personal check 45 (or a commercial check) proceeds at a check reading system 100 in the following manner:

1. At step 201, the cashier or teller processes the check through the check reading system 100. The check reading system 100 will read the MICR code line. In addition, the check reading system 100 will image the check, read the bar code, retrieve and parse the bar code data to find k (the total length bar code data string), m (the total length of the certificate), l (the length of the name and address byte, if any), digital signature 1 (if present) and digital signature 2 (if present). (The specifics of the preferred method used to parse the bar code data string are set forth below).

2. At step 202, using the widely available public key of CA 46, the check reading system 100 runs a certificate validation process to verify the authenticity of the certificate. As set forth in more detail below, if the certificate is deemed not valid, the check is rejected and the verification process stops.

3. Assuming that the certificate is validated, the check reading system 100 then parses the public key certificate to obtain the check printer's authentic public key (step 203).

4. The check reading system 100 then assembles the critical document data string at 204. In the case of personal check 45, the account holder's name and address character string is also preferably appended with the ASCII representation of the MICR code line on the check as previously read by the payment system.

5. At steps 205 and 206, if the check presenter is presenting a personal check 45, the payment system prompts the cashier to ask the check presenter to input his/her PIN using a keypad that is connected to (or is an integral part of) the check reading system 100.

6. The check reading system 100 then appends the ASCII representation of the PIN to the critical document data to form the authenticatable data string and then applies the check printer's authentic public key obtained in step 203 to the authenticatable data string (step 207).

7. If digital signature 2 on the authenticatable data string validates (step 208), then the check is accepted (step 209) because successful validation indicates that:

the critical document data has not been altered or tampered with in any way since the bar code was produced; and, the presenter provided the correct PIN and is therefore presumed authorized to write the check.

8. Of course, if the party presenting the check refuses to supply a PIN or cannot supply a PIN which causes digital signature 2 to validate, (such as in the case where the party presenting the check is an attacker 47), then the check may be refused as payment (step 210).

In some instances, the account holder 44 is not present to enter a PIN 43 in order to verify a personal check. This might occur, for example, in "back-room" anti-fraud verification processing that is performed away from the teller window or point of purchase. It might also occur in those cases where account holder 44 places a remote order via telephone, Internet, or other similar communications network, and then forwards a check to the retailer or other person or entity, who would like to at least verify that the check has not been tampered with since leaving the hand of the person writing the check. If the customer or customer PIN is unavailable, the following steps are performed instead of steps 206–209:

1. The check reading system 100 checks to see if there is a digital signature 1 present in the retrieved bar code data at 212.

2. If digital signature 1 is not present, then the check reading system 100 checks to see if digital signature 2 is available at 213. If digital signature 2 is also missing, the verification cannot be completed and the process is stopped (step 214). If digital signature 2 is present, then the personal value document may be validated by running a PIN-generating algorithm or similar method (215), using each possible PIN permutation generated by the method to assemble the authenticatable data string until the personal value document verifies 3. If the digital signature 1 is present, the process continues to step 216. The check reading system 100 then assembles the critical document data and applies digital signature 1 to the critical document data at 216 in order to verify that digital signature 1 is valid for the critical document data.

4. If digital signature 1 validates (step 217), then the check is authenticated (step 210) because successful validation indicates that:
   the critical document data has not been altered or tampered with in any way since the bar code was produced.

The above steps would also be carried out in an alternate embodiment of the present invention, i.e., in the case where a customer presents a bank check or business check for deposit or cashing.

Finally, as digital signature 2 is preferred in the cases where only one digital signature is going to be printed on a personal value document (for the reasons set forth above), check reading system 100 might be programmed to check for digital signature 2 prior to checking for digital signature 1. Though it is preferred in those cases where the PIN or customer is unavailable to verify personal checks by first checking for the presence of digital signature 1, if only digital signature 2 were present on the check, check reading system 100 might first execute the PIN-generating algorithm or similar method until the personal check verifies.

1. Parsing the Bar Code Data String

As set forth above, the bar code data on the value document is parsed by the payment system to find k (the total length bar code data string), m (the total length of the certificate), l (the length of the critical data field byte), digital signature 1 (if present) and digital signature 2 (if present).

Figure 10:
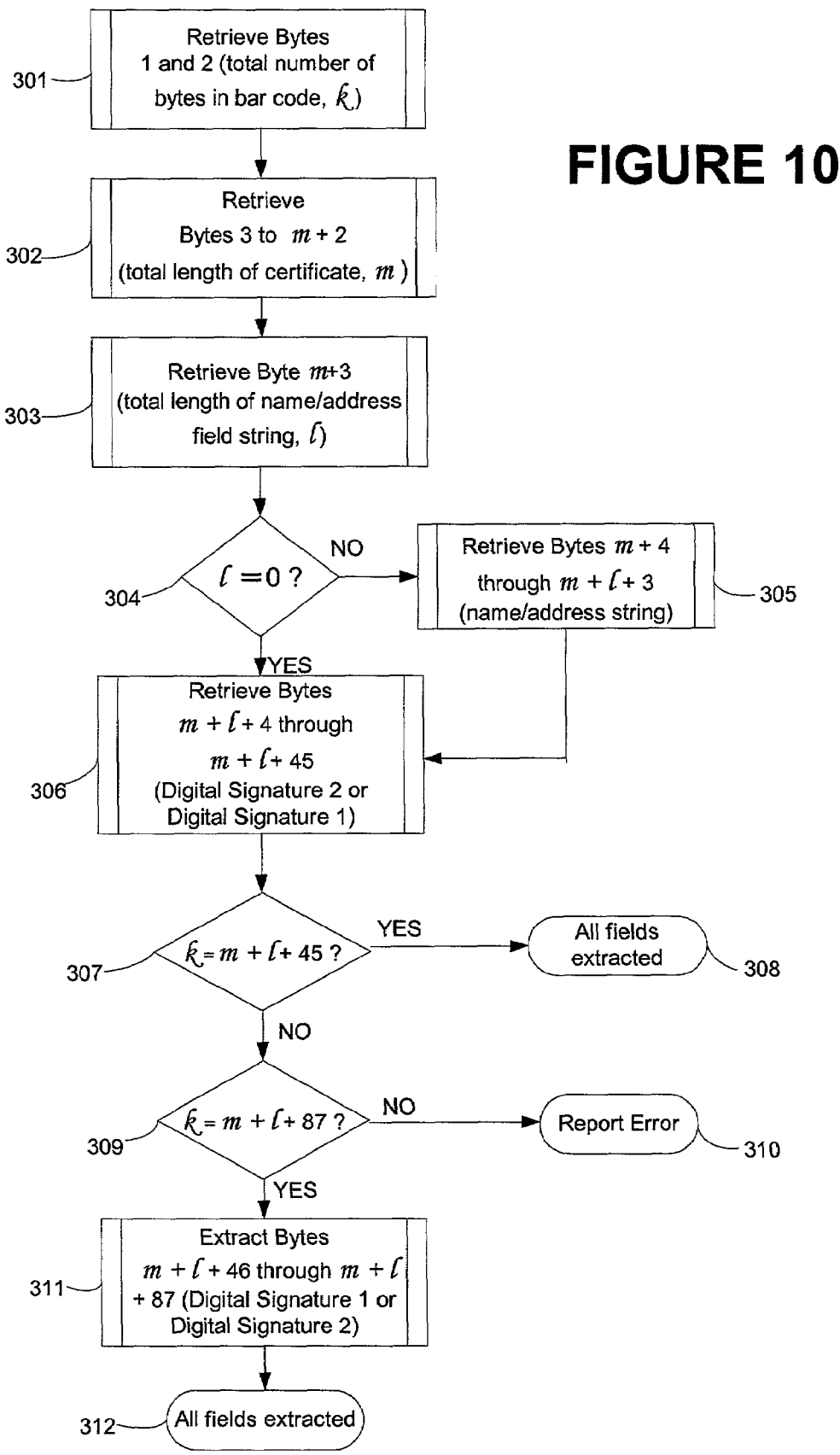
FIG. 10 is one embodiment of a method of parsing data fields in bar code data string 60 in accordance with preferred embodiment of the present invention.

The bar code string may be read from a 200 or 240 dot per inch gray scale image of the bar code, or it can be scanned using many different laser bar code scanners currently available. In either case, a string of bytes is retrieved from the bar code. Referring to FIG. 10, in order to parse the bar code data string into its component data fields, the following steps in a preferred method 203 are effected:

1. k, the binary representation the total number of bytes in the bar code is retrieve from the first two bytes of the bar code at step 301. All integers preferably are stored with the most significant bits on the left. Thus, for example, if $b_1, b_2$ are one byte integers stored as the first two bytes in the bar code data string, k is reconstructed as: $k=b_1 \cdot 2^8 + b_2$ 2. The third byte is then retrieved from bar code data string at step 302. This byte is (a binary representation of) m, the total length of the certificate. Bytes 3 through m+2 are thus the printer certificate.

3. Byte m+3 is retrieved at step 303. This is l, the length of the critical data field string.

4. If l=0 (step 304), a critical data field string is not part of the bar code security data string and the process continues on to step 306; if $l \geq 1$, bytes m+4 through m+l+3 are the critical data string, and are retrieved at step 305.

5. As digital signature 2 comprises 42 bytes (21 bytes for $r_2$ and $s_2$ each) bytes m+l+4 through m+l+45 are then retrieved at step 306. If $b_{m+l+4} \ldots b_{m+l+45}$ are the 1 byte integers which store digital signature 2, then $$r_2 = \sum_{i=1}^{21} 2^{8(21-i)} b_{m+l+3+i} \text{ and,}$$

$$s_2 = \sum_{i=1}^{21} 2^{8(21-i)} b_{m+l+24+i}$$

Where digital signature 2 is $(r_2, s_2)$.

6. If k=45+m+l (step 307), then the process stops (step 308), as all fields have been extracted from the bar code. Otherwise, the barcode parsing proceeds to step 309.

7. At step 309, the sixth data field 66 (including digital signature 1), if present, is then extracted. As digital signature 1 also comprises 42 bytes (21 bytes for $r_1$ and $s_1$ each), k should be k=45+m+l+42 or 87+m+l (step 309). If $k \neq 87+m+l$, then report an error and stop (step 310). Otherwise, digital signature 1 is extracted from bytes $b_{m+l+46} \ldots b_{m+l+87}$ (step 311). Again interpreting each byte as a binary integer with most significant bit on the left, reconstruct $(r_1, s_1)$ as $$r_1 = \sum_{i=1}^{21} 2^{8(21-i)} b_{m+l+45+i}, \text{ and,}$$

$$s_1 = \sum_{i=1}^{21} 2^{8(21-i)} b_{m+l+66+i}.$$

All data fields should now be parsed from the bar code string and the process completed (step 312).

3. Validating a Public Key Certificate

Figure 11:
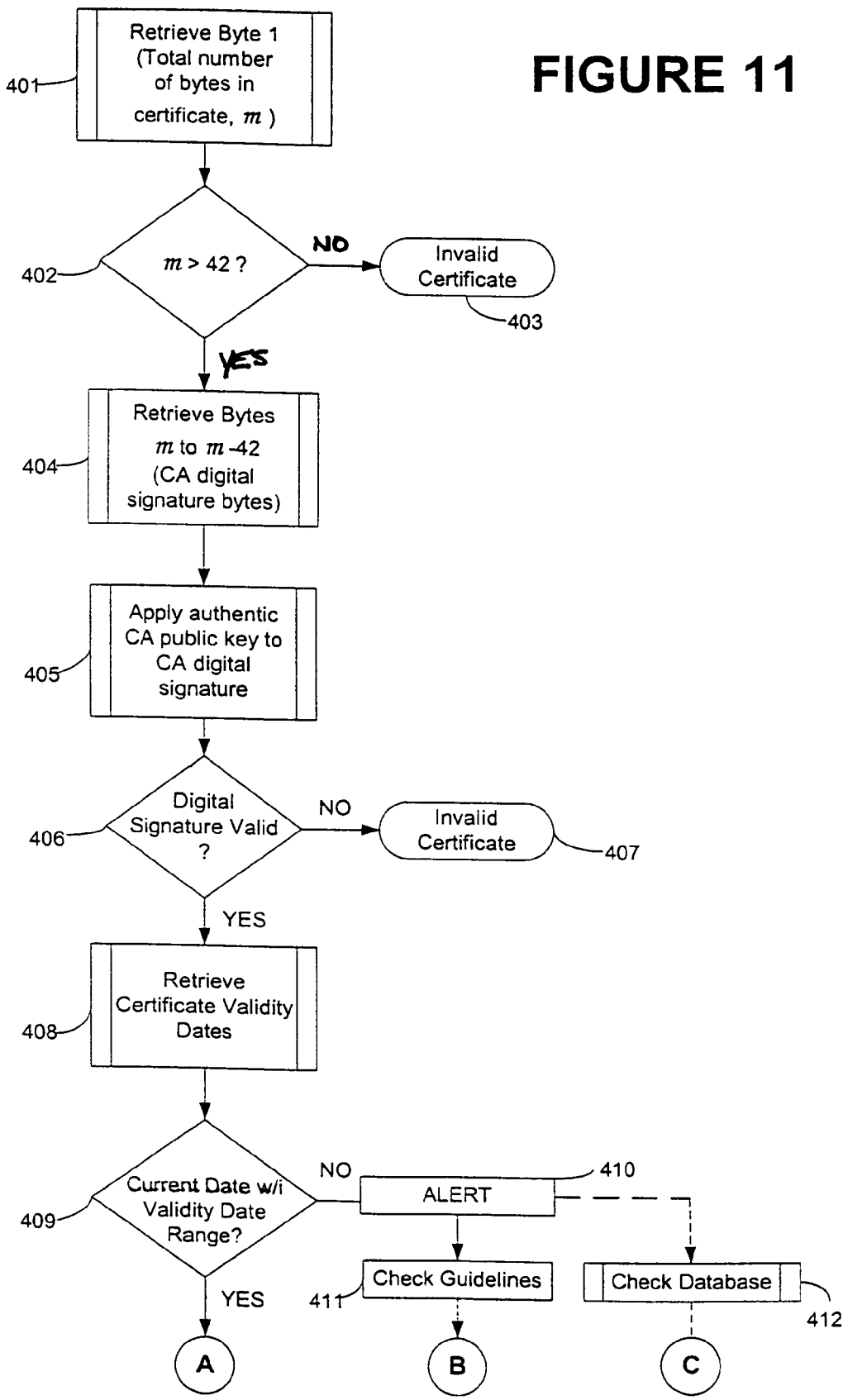
FIG. 11 is one embodiment of a method of validating a public key certificate contained in a value document in accordance with preferred embodiment of the present invention.
Figure 11:
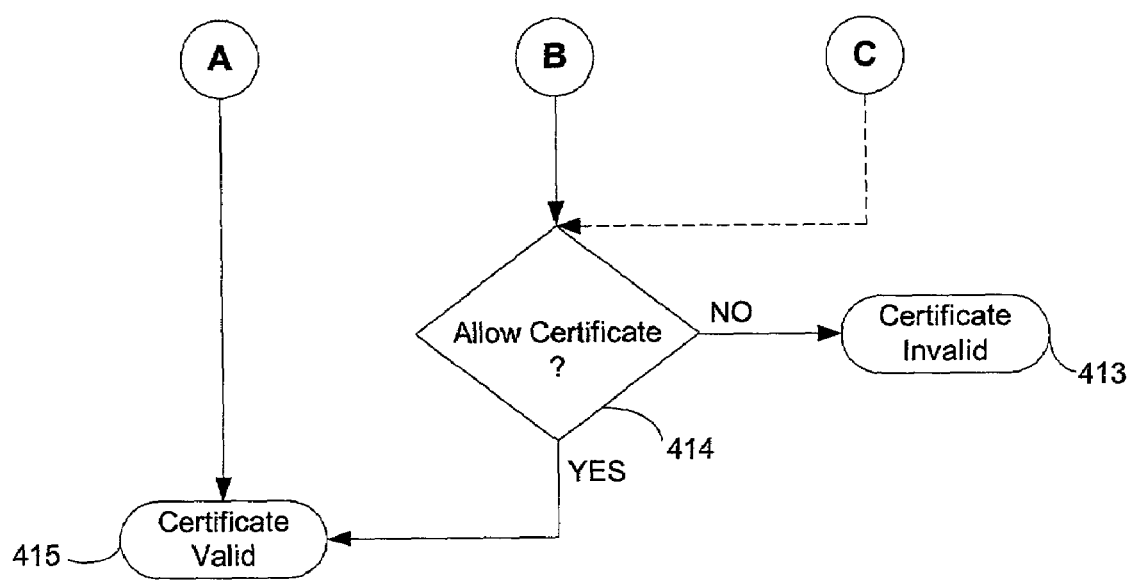

Once the bar code string is parsed by parsing module 120, an attempt to validate public key certificate is made in validation module 130. As shown in FIG. 11, a preferred method 202 for validating an m-byte certificate includes the following steps:

1. Let $c_1 \ldots c_m$ represent the bytes in the certificate. According to the preferred embodiment, the first byte of the certificate, $c_1$, a binary representation of m, is retrieved at 401. As with digital signatures 1 and 2, in a preferred embodiment of the present invention, if $m \leq 42$ (step 402), the certificate is not valid and the process stops (step 403).

2. When m>42, then $c_{m-41} \ldots c_m$ are the purported CA signature bytes, and the data signed in the certificate are bytes $c_1 \ldots c_{m-42}$. The purported CA signature (r,s) is then reconstructed at step 404 as:

$$r = \sum_{i=1}^{21} 2^{8(21-i)} c_{m-42+i}$$

$$s = \sum_{i=1}^{21} 2^{8(21-i)} c_{m-21+i}$$

As before, bytes $c_{m-41} \ldots c_m$ are interpreted as 1-byte integers stored with most significant bit on the left.

3. The authentic public key for the CA is applied to (r,s) in order to verify that it is a valid digital signature on the data $c_1 \ldots c_{m-42}$ (step 405). If the digital signature fails to verify (step 406), then the certificate is not valid (step 407).
4. The validity dates stored in the data fields 54 and 55 of the certificate are then retrieved (step 408) and compared with the current date (step 409). If the current date is not within the date limits specified in the certificate, a stale/not-yet-valid certificate alert is issued (step 410).

Typically, if an alert (step 410) is issued, the person performing the verification process (e.g., teller, cashier, retailer) will need to decide if the certificate is allowed even though it has expired. In general, check stock will be printed using a certificate that remains valid at least some specified number of years; for example, two years beyond the print date. Thus, an expired certificate alert at a point of presentment could in such instances indicate that the check stock is likely two or more years old. The payee or bank must decide whether to honor or reject the check stock, probably based on guidelines provided by the certificate authority to all participants in the security process (step 411).

Instead of making a decision to honor or reject a check based on CA guidelines, an additional verification process may be taken. In such instance, a central database of revoked certificates may be consulted (shown in dashed lines in step 412). The certificate serial number stored within the certificate would preferably serve as an index into this database. The revocation database might reside on a secure Internet site that can be downloaded periodically by the institution to a secure local computer at the merchant's location. Inclusion in this database implies that the certificate is not valid. This database will likely be of limited size, since it will only contain serial numbers for certificates that have been revoked. Certificates will be revoked only in extraordinary circumstances, such as when a corresponding private key is compromised in some way. This optional verification step will likely be undertaken only when there is a perceived higher than normal fraud risk for a given check. If the certificate fails under the guidelines or the database, it is declared invalid (step 413). Otherwise it is allowed (step 414) and the certificate is deemed valid (step 415).

If digital signature (r, s) verifies as a digital signature on data bytes $c_1 \ldots c_{m-42}$, then bytes $c_{14} \ldots c_{35}$ are the compressed representation of the authentic public key owned by the entity named in the ASCII byte string $c_{35} \ldots c_{m-42}$. The fact that a validated certificate exists is evidence that the entity named in $c_{35} \ldots c_{m-42}$ is authorized to print bar-coded secured checks.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for creating a self-authenticating document having critical document data, the self-authenticating document comprising:
    a first digital signature including a first digest of said critical document data;
    a second digital signature including a second digest of said critical document data and a personal identification number (PIN); and,
    a public key certificate including an authentic public key for validating said first and second digital signatures, wherein said first digital signature, said second digital signature, and said public key certificate are stored in machine-readable format on said self-authenticating document.
2. The self-authenticating document of claim 1, wherein said critical document data includes data contained in a magnetic ink character recognition (MICR) code line on said self-authenticating document.
3. The self-authenticating document of claim 2, wherein said critical document data further includes ASCII text from said document.
4. The self-authenticating document of claim 3, wherein said ASCII text is the account name and address printed on said self-authenticating document.
5. The self-authenticating document of claim 2, wherein said document is a personal value document.
6. The self-authenticating document of claim 5, wherein said personal value document is a personal check.
7. The self-authenticating document of claim 5, wherein said personal value document is selected from the group consisting of: an identification card, a Social Security card, a driver's license, a birth certificate, a credit card, a voter's registration card, and a passport.
8. The self-authenticating document of claim 1, wherein said machine-readable format is a bar code.
9. The self-authenticating document of claim 8, wherein said bar code format is PDF 417.
10. The self-authenticating document of claim 8, wherein said bar code comprises a plurality of data fields.
11. The self-authenticating document of claim 10, wherein said bar code includes:
    a first data field including data representing the number of bytes of data in said bar code;
    a second data field including said public key certificate;
    a third data field including data representing the number of bytes of data in said critical document data; and,
    a fourth data field including said critical document data.
12. The self-authenticating document of claim 11, wherein said bar code further includes a fifth data field including said second digital signature.

13. The self-authenticating document of claim 11, wherein said bar code further includes a sixth data field including said first digital signature.

14. A system for creating a self-authenticating document having critical document data, the self-authenticating document comprising:
  a digital signature including a digest of said critical document data and personal identification number (PIN); and,
  a public key certificate including an authentic public key for validating said digital signature, wherein said digital signature and said public key certificate are stored on said self-authenticating document, wherein said public key certificate further includes identity information of the owner of said authentic public key and a digital signature of said authentic public key and said owner identity information, and wherein said digital signature is issued by a third party, and wherein said digital signature and said public key certificate are stored in machine-readable format on said self-authenticating document.

15. The self-authenticating document of claim 14, wherein said document is a personal value document.

16. The self-authenticating document of claim 15, wherein said personal value document is a personal check.

17. The self-authenticating document of claim 15, wherein said personal value document is selected from the group consisting of: an identification card, a Social Security card, a driver's license, a birth certificate, a credit card, a voter's registration card, and a passport.

18. The self-authenticating document of claim 15, wherein said critical document data includes data contained in a magnetic ink character recognition (MICR) code line on said self-authenticating document.

19. The self-authenticating document of claim 18, wherein said critical document data further includes ASCII text from said self-authenticating document.

20. The self-authenticating document of claim 19, wherein said ASCII text is the account name and address printed on said self-authenticating document.

21. The self-authenticating document of claim 14, wherein said machine-readable format is a two-dimensional bar code.

22. The self-authenticating document of claim 21, wherein said two-dimensional bar code format is PDF 417.

23. The self-authenticating document of claim 21, wherein said two-dimensional bar code comprises a plurality of two-byte data fields.

24. The self-authenticating document of claim 23, where said two-dimensional bar code includes:
  a first data field including data representing the number of bytes of data in said bar code;
  a second data field including said public key certificate;
  a third data field including data representing the number of bytes of data in said critical document data; and,
  a fourth data field including said critical document data.

25. The self-authenticating document of claim 24, wherein said two-dimensional bar code further includes a fifth data field including said digital signature.

26. The self-authenticating document of claim 14, wherein said personal identification number is a four digit number comprising four bytes of data.

27. The self-authenticating document of claim 14, wherein said personal identification number is selected by the owner of said personal value document.

28. The self-authenticating document of claim 14, wherein a third party responsible for printing said personal value document selects said personal identification number.

29. The self-authenticating document of claim 14, wherein a third party responsible for issuing said personal value document selects said personal identification number.

30. The self-authenticating document of claim 14, wherein the digital signature algorithm used to create said digest of said digital signature is a public key cryptographic algorithm.

31. The self-authenticating document of claim 30, wherein said digital signature algorithm is an elliptic curve digital signature algorithm (ECDSA).

32. The self-authenticating document of claim 14, wherein said third-party digital signature is created using the elliptic curve digital signature algorithm (ECDSA).

33. The self-authenticating document of claim 32, wherein said ECDSA algorithm includes a first group of shared parameters for implementing said digital signature.

34. The self-authenticating document of claim 33, wherein said ECDSA used to create said third-party digital signature includes a second group of shared parameters for implementing said third-party digital signature.

35. The self-authenticating document of claim 34, wherein said first group of shared parameters is the same as said second group of shared parameters.

36. The self-authenticating document of claim 34, wherein said first group of shared parameters is different from said second group of shred parameters.

37. The self-authenticating document of claim 34, wherein said first and second groups of shared parameters is distributed to a community of users of said self-authenticating document.

38. The self-authenticating document of claim 37, wherein said third party is a certificate authority.

39. The self-authenticating document of claim 37, wherein said community of users includes a party responsible for issuing said self-authenticating document, a party responsible for printing said self-authenticating document, and said certificate authority.

40. The self-authenticating document of claim 39, wherein said community of users further includes an owner of said self-authenticating document.

41. The self-authenticating document of claim 14, when said public key certificate is affixed to said self-authenticating document by a third party responsible for printing said self-authenticating document.

42. The self-authenticating document of claim 14, wherein said public key certificate is affixed to said self-authenticating document by a third party responsible for issuing said public key certificate.

43. The self-authenticating document of claim 42, wherein said third party is a certificate authority.

44. A system for creating a personal value document, the personal value document comprising:
  a first digital signature including a first digest of critical document data, said critical document data including data contained in a magnetic ink character recognition (MICR) code line on said personal value document;
  a second digital signature including a second digest of said critical document data and a personal identification number (PIN); and,
  a public key certificate including an authentic public key for validating said first and second digital signatures, wherein said first digital signature, said second digital signature, and said public key certificate are stored in a bar code format on said personal value document.

45. The personal value document of claim 44, wherein said personal value document is a personal check.

46. The personal value document of claim 44, wherein said critical document data further includes ASCII text from said personal check.

47. The personal value document of claim 46, wherein said ASCII text is the account name and address printed on said personal check.

48. The personal value document of claim 46, wherein said bar code comprises a plurality of date fields, including:
   a first data field including data representing the number of bytes of data in said bar code;
   a second data field including said public key certificate;
   a third data field including data representing the number of bytes of data in said critical document data; and,
   a fourth data field including said critical document data.

49. The personal value document of claim 48, wherein said two-dimensional bar code further includes:
   a fifth data field including said second digital signature; and,
   a sixth data field including said first digital signature.

50. The personal value document of claim 44, wherein the digital signature algorithm used to create said first digest of said first digital signature and said second digest of said second digital signature is a public key cryptographic algorithm.

51. The personal value document of claim 50, wherein the digital signature algorithm used to create said first digest is the elliptic curve digital signature algorithm (ECDSA).

52. The personal value document of claim 51, wherein the digital signature algorithm used to create said second digest is the elliptic curve digital signature algorithm (ECDSA).

53. The personal value document of claim 44, wherein said personal identification number is selected by the owner of said value document.

54. The personal value document of claim 52, wherein said public key certificate further includes identity information of the owner of said authentic public key and a digital signature of said authentic public key and said owner identity information, and wherein said digital signature is issued by a certificate authority.

55. The personal value document of claim 54, wherein said ECDSA used to create said first and second digital signatures respectively includes a first group of shared parameters for implementing said first and second digital signatures, and wherein said ECDSA used to create said certificate authority digital signature includes a second group of shared parameters for implementing said certificate authority digital signature.

56. The personal value document of claim 55, wherein said first group of shared parameters is the same as said second group of shared parameters.

57. The personal value document of claim 55, wherein said first group of shared parameters is different from said second group of shared parameters.

58. The personal value document of claim 55, wherein said first and second groups of shared parameters is distributed to a community of users of said personal value document.

59. The personal value document of claim 58, wherein said community of users includes a party responsible for issuing sad personal value document, a party responsible for printing said personal value document, and said certificate authority.

60. The personal value document of claim 59, wherein said community of users further includes an owner of said personal value document.

61. The personal value document of claim 44, wherein said first and second digital signatures, and said public key certificate are affixed to said personal value document by a third party responsible for printing said personal value document.

62. A method for creating a self-authenticating document having critical document data, said critical document data including machine-readable data printed on said self-authenticating document, said method comprising the steps of:
   creating a first digital signature by signing said critical document data with a digital signature algorithm;
   creating a second digital signature by signing said critical document data critical document data and a personal identification number (PIN) with said digital signature algorithm;
   retrieving a public key certificate including an authentic public key for validating said first and second digital signatures; and,
   affixing said first and second digital signatures and said public key certificate to said self-authenticating document in a machine-readable format.

63. The method of claim 62, wherein said critical document data includes ASCII text from said self-authenticating document, and further comprising the step of:
   storing said ASCII text in a machine-readable format on said self-authenticating document prior to said first digital signature creating step.

64. The method of claim 62, further comprising the steps of:
   selecting a group of shared parameters corresponding to said digital signature algorithm for implementing said first and second digital signatures;
   generating a public key and a private key using said shared parameters;
   certifying said public key via a certificate authority,
   wherein said selecting, generating and certifying steps are carried out prior to said first digital signature creation step.

65. The method of claim 62, wherein said step of creating said first digital signature includes the substeps of:
   generating a public key and a private key using said digital signature algorithm;
   assembling said critical document data from said self-authenticating document; and,
   applying said private key generated by said digital signature algorithm to said critical document data to create said first digital signature.

66. The method of claim 65, wherein said step of creating said second digital signature includes the substeps of:
   generating said personal identification number (PIN);
   appending said personal identification number (PIN) to said critical document data to create an authenticatable data string; and,
   applying said private key generated by said digital signature algorithm to said authenticatable data string to create said second digital signature.

67. The method of claim 66, wherein said digital signature algorithm is an elliptic curve digital signature algorithm (ECDSA).

68. The method of claim 66, wherein said step of affixing said first and second digital signatures to said self-authenticating document includes the substeps of:
   assembling a k-byte data string, wherein k includes the number of bytes in said critical document data, said authenticatable data, and said public key certificate; and, generating a machine-readable data string from said k-byte data string.

69. The method of claim 68, further comprising the step of calculating the total amount of bytes of data, k, including said critical document data, said authenticatable data string, and said public key certificate, prior to said k-byte data string assembling step.

70. The method of claim 69, wherein said first and second digital signatures and said public key certificate are affixed in bar-code format to said self-authenticating document, and wherein said step of generating said machine readable data string comprises the substep of converting said k-byte data string into bar code print data.

71. A method for creating a self-authenticating document having critical document data, said critical document data including machine-readable data printed on said self-authenticating document, said method comprising the steps of:
creating a first digital signature by signing said critical document data with a digital signature algorithm;
creating a second digital signature by signing said critical document data and a personal identification number (PIN) with said digital signature algorithm retrieving a public key certificate including an authentic public key for validating said first and second digital signatures;
determining whether said second digital signature is to be affixed to said self-authenticating document;
determining whether said first digital signature is to be affixed to said self-authenticating document;
affixing said public key certificate and at least one of said first digital signature and said second digital signature to said self-authenticating document in machine-readable code, based on the results of the second digital signature and first digital signature determining steps.

72. The method of claim 71, wherein said critical document data includes ASCII text from said self-authenticating document, and further comprising the step of:
storing said ASCII text in a machine-readable format on said self-authenticating document prior to said first digital signature creating step.

73. The method of claim 71, further comprising the steps of:
selecting a group of shared parameters corresponding to said digital signature algorithm for implementing said at least one of said first and second digital signatures;
generating a public key and a private key using said shared parameters;
certifying said public key via a certificate authority,
wherein said selecting, generating and certifying steps are carried out prior to said first digital signature creation step.

74. The method of claim 71, said step of creating said first digital signature includes the substeps of:
generating a public key and a private key using said digital signature algorithm;
assembling said critical document data said self-authenticating document; and,
applying said private key generated by said digital signature algorithm to said critical document data to create said first digital signature.

75. The method of claim 74, said step of creating said second digital signature includes the substeps of:
generating said personal identification number (PIN);
appending said personal identification number (PIN) to said critical document data to create an authenticatable data string; and,
applying said private key generated by said digital signature algorithm to said authenticatable data string to create said second digital signature.

76. The method of claim 71, wherein said digital signature algorithm is an elliptic curve digital signature algorithm (ECDSA).

77. The method of claim 71, wherein if it is determined that said first digital signature is to be affixed to said self-authenticating document, said step of affixing said first digital signature to said self-authenticating document includes the substeps of:
assembling a k-byte data string, wherein k includes the number of bytes in said critical document data; and,
generating a machine-readable data string from said k-byte data string.

78. The method of claim 71, wherein if it is determined that said second digital signature is to be affixed to said self-authenticating document, said step of affixing said second digital signature to said self-authenticating document includes the substeps of:
assembling a k-byte data string, wherein k includes the number of bytes in said authenticatable data string; and,
generating a machine-readable data string from said k-byte data string.

79. The method of claim 71, wherein if it is determined that said first and said second digital signatures are to be affixed to said self-authenticating document, said step of affixing said first and second digital signatures to said self-authenticating document includes the substeps of:
assembling a k-byte data string, wherein k includes the number of bytes in said critical document data and said authenticatable data string; and,
generating a machine-readable data string from said k-byte data string.

80. The method of claim 79, further comprising the step of calculating the total amount of bytes of data, k, in said critical document data and said authenticatable data string prior to said k-byte data string assembling step.

81. A method of authenticating a self-authenticating document, comprising the steps of:
processing machine-readable data on said self-authenticating document to obtain digital signature data and a public key certificate;
processing said public key certificate to obtain public key certificate data including an authentic public key and a third-party digital signature, said public key certificate processing step including the substeps of:
validating said public key certificate with a third-party public key by applying said third-party public key to said third-party digital signature; and,
parsing said public key certificate to obtain said authentic public key;
assembling critical document data from said self-authenticating document, wherein said critical document data includes at least magnetic ink character recognition (MICR) data printed on said self-authenticating document;
determining whether an authentic personal identification number (PIN) is available for appending to said critical document data;
wherein, if said authentic PIN is available;
appending said authentic PIN to said critical document data to create an authenticatable data string; and,
applying said authentic public key to said digital signature data to validate said authenticatable data string, wherein said self-authenticating document is authenticated if said authenticatable data string is validated.

82. The authenticating method of claim 81, wherein said self-authenticating document is a personal check, and wherein said critical document data includes ASCII text printed on said personal check.

83. The authenticating method of claim 81, further comprising the steps of:
   determining whether a first digital signature is present in said digital signature data, if it is determined that said authentic personal identification number (PIN) is not available;
   applying said authentic public key to said digital signature data to validate said critical document data, wherein said self-authenticating document is authenticated if said critical document data is validated.

84. The authenticating method of claim 83, wherein if it is determined that said authentic PIN is not available and that said first digital signature is not preset in said digital signature data, further comprising the steps of:
   determining whether a second digital signature is present in said digital signature data, and,
   if said second digital signature is present;
      generating a plurality of PINs;
      appending each of said plurality of PINs to said critical document data to create a plurality of verifiable data strings; and,
      applying said authentic public key to said second digital signature in order to validate one of said verifiable data strings as said authenticatable data string and to authenticate said self-authenticating document.

85. The authenticating method of claim 84, wherein said step of generating PINs is carried out in a document reading system executing a PIN-generating algorithm.

86. The authenticating method of claim 83, wherein said machine-readable data is bar-code data, said machine-readable data processing step including the substeps of:
   retrieving said bar code data from said self-authenticating document; and,
   parsing data fields in said bar code data to obtain at least said public key certificate, said digital signature data, and k, where k, is the total number of bytes in said bar code data.

87. The authenticating method of claim 81, wherein said third party is a certificate authority.

88. The authenticating method of claim 81, wherein said public key certificate is comprised of m bytes, and wherein said public key certificate parsing substep includes the further substeps of:
   retrieving at least a first byte, $c_1$, of said m bytes from said public key certificate, wherein said at least a first byte $c_1$ is a binary representation of said number of bytes m in said public key certificate;
   determining whether said binary representation of said number of bytes m in said at least a first byte $c_1$, is greater than the number of bytes of data in said digital signature data, n;
   retrieving the remainder of said m bytes, if said determining step determines that said at least a first byte $c_1$ is greater than the number of bytes of data in said digital signature data, n; and,
   applying said authentic public key to said digital signature data in order to verify said at least one of said first and second digital signatures.

89. The authenticating method of claim 88, wherein said public key certificate parsing substep includes the further substeps of:
   retrieving public key validity date data from said public key certificate;
   determining if said public key validity date data is within an accepted date range; and,
   validating said public key certificate with public key validity date data, if said public key validity date data is within said accepted date range.

90. The authenticating method of claim 89, wherein said public key certificate parsing substep includes the further substep of:
   issuing an alert if said public key validity date data is not within an accepted date range.

91. The authenticating method of claim 90, wherein said public key certificate parsing substep includes the further substeps of:
   deciding whether to validate said public key certificate if said public key validity date data is not within an accepted date range, by checking guidelines issued by said third party.

92. The authenticating method of claim 90, wherein said public key certificate parsing substep includes the further substeps of:
   deciding whether to validate said public key certificate if said public key validity date data is not within an accepted date range, by consulting a public key certificate database.

93. The authenticating method of claim 83, further comprising the step of:
   presenting said self-authenticating document by an owner of said self-authenticating document to a commercial entity for authentication, wherein said presenting step is carried out prior to said machine-readable data processing step.

94. The authenticating method of claim 93, wherein said authentic PIN-determining step further includes the substep of:
   determining whether an owner of said self-authenticating document is available to input said authentic PIN, wherein said PIN-availability step determines that said authentic PIN is not available if said owner of said self-authenticating document is not available.

95. A system for reading a self-authenticating document having machine-readable data including critical document data, digital signature data and a public key certificate, the system comprising:
   personal identification means for receiving a personal identification number (PIN) from a presenter of said self-authenticating document; and,
   image scanning and processing means for reading said self-authenticating document and retrieving said machine-readable data from said self-authenticating document, and for assembling an authenticatable data string from said critical document data and said received PIN;
   parsing means for parsing said machine readable data to obtain said digital signature data and said public key certificate; and,
   validating means for certifying said public key certificate to obtain an authentic public key, and for applying said authentic public key to said digital signature data for validating said authenticatable data string, said validating means comprising:

a certification validation subsystem for validating said public key certificate with a third party public key and for obtaining said authentic public key; and, a digital signature validation subsystem for validating said digital signature data with said authentic public key, wherein said self-authenticating document is authenticated if said authenticatable data string is validated.

96. The system of claim 95, wherein said machine-readable critical document data includes data stored in a first and second format on said self-authenticating document, and wherein said image scanning and processing means comprises:

a first machine-readable data reading system for reading said critical document data stored in a first format from said self-authenticating document; and, a second machine-readable data reading system for reading said critical document data stored in a second format from said self-authenticating document.

97. The system of claim 96, wherein said first format is magnetic ink character recognition (MICR) code, and said second format is bar code, and wherein said first machine-readable data reading system reading system is a MICR reader, and said first machine-readable data reading system reading system is a bar code reader.

98. The system of claim 95, wherein said machine-readable critical document data is stored in a bar code format on said self-authenticating document, and wherein said image scanning and processing means includes a bar code reading system for reading said bar code format to retrieve said critical document data.

99. A system for reading a self-authenticating document, said self-authenticating document having machine-readable data including first critical document data stored on a magnetic ink character recognition (MICR) line, and first and second digital signatures, and a public key certificate stored on a bar code line, the system comprising:

a personal identification subsystem for receiving a personal identification number (PIN) from a presenter of said self-authenticating document; and, an image scanner and processor system for reading said self-authenticating document and retrieving said machine readable data from said self-authenticating document, and for assembling an authenticatable data string from said first critical document data and said received PIN, said image scanner and processor including:

a magnetic ink character recognition (MICR) reader subsystem for retrieving said first critical document data from said MICR line;

a bar code reader subsystem for retrieving said first and second digital signatures and said public key certificate stored on a bar code line;

a parsing subsystem for parsing said bar code to obtain said first and second digital signatures and said public key certificate; and, a validating subsystem for certifying said public key certificate to obtain an authentic public key and for applying said antic public key to at least said second digital signature for validating said authenticatable data string, wherein said self-authenticating document is authenticated if said authenticatable data string is validated.

100. The system of claim 99, wherein said machine-readable data further includes second critical document data stored in said bar code line, wherein said bar code reader subsystem further retrieves said second critical document data stored in said bar code line, and wherein said authenticatable data string assembled by said image scanner and processor subsystem includes said second critical document data.

101. The system of claim 100, wherein said second critical document data comprises ASCII text from said self-authenticating document.

102. The system of claim 101, wherein said ASCII text is the account name and address printed on said self-authenticating document.

103. The system of claim 99, wherein said validating means further applies said authentic public key to said first digital signature to validate said critical document data when no PIN is received, and wherein said self-authenticating docent is authenticated if said critical document data is validated.

* * * * *